United States Patent
Sallaway et al.

(10) Patent No.: US 7,443,936 B1
(45) Date of Patent: Oct. 28, 2008

(54) SEQUENCE DETECTOR USING VITERBI ALGORITHM WITH REDUCED COMPLEXITY SEQUENCE DETECTION VIA STATE REDUCTION USING SYMBOL FAMILIES

(75) Inventors: Peter J. Sallaway, San Diego, CA (US); Sreen Raghavan, La Jolla, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 52 days.

(21) Appl. No.: 11/431,451

(22) Filed: May 9, 2006

Related U.S. Application Data

(62) Division of application No. 11/044,537, filed on Jan. 27, 2005, now abandoned, which is a division of application No. 09/560,109, filed on Apr. 28, 2000, now Pat. No. 7,050,517.

(51) Int. Cl.
*H04B 1/10* (2006.01)
*H03D 1/00* (2006.01)
*H03M 13/03* (2006.01)

(52) U.S. Cl. .................. 375/350; 375/341; 714/795

(58) Field of Classification Search .......... 375/350, 375/340, 341, 348, 342; 714/795, 796
See application file for complete search history.

(56) References Cited

U.S. PATENT DOCUMENTS

| | | | | |
|---|---|---|---|---|
| 5,291,499 A | 3/1994 | Behrens et al. | ............... | 371/43 |
| 5,502,735 A | 3/1996 | Cooper | ......... | 371/43 |
| 5,602,507 A | 2/1997 | Suzuki | ......... | 329/304 |
| 5,638,065 A | 6/1997 | Hassner et al. | ............... | 341/59 |
| 5,654,667 A | 8/1997 | Adachi | ......... | 329/306 |
| 5,809,079 A | 9/1998 | Hayashi | ......... | 375/262 |
| 5,841,478 A | 11/1998 | Hu et al. | ............... | 348/426 |

(Continued)

FOREIGN PATENT DOCUMENTS

DE 19626076 1/1997

(Continued)

OTHER PUBLICATIONS

Hagenauer et al., "A Viterbi Algorithm with Soft-Decision Outputs and its Applications", *Procs. GLOBECOM '89*, Nov. 1989, pp. 1680-1686.

(Continued)

*Primary Examiner*—Khai Tran
(74) *Attorney, Agent, or Firm*—Ronald J. Meetin

(57) ABSTRACT

A sequence detector (1600-w) operating generally according to the Viterbi algorithm uses state reduction via division into symbol families to reduce the complexity of sequence detection. The sequence detector contains a branch metric generator (1402-w), comparison circuitry (1603-w), and symbol generation circuitry (1604, 1605-w, and 1606) for converting digital values of an input signal into a sequence of symbols chosen from an alphabet of predefined symbols allocated into multiple non-overlapping families each formed with a plurality of the predefined symbols. The branch metric generator makes intra-family branch selections, each of which is one of a plurality of branches respectively corresponding to a family's symbols, and generates corresponding branch metrics. The comparison circuitry determines state metrics and generates corresponding comparison results. The symbol generation circuitry utilizes the comparison results and the branch selections, or selection information generated from the branch selections, to generate the sequence of predefined symbols.

42 Claims, 18 Drawing Sheets

U.S. PATENT DOCUMENTS

| | | | | |
|---|---|---|---|---|
| 5,859,861 | A | 1/1999 | Oh | 371/43.7 |
| 5,960,011 | A | 9/1999 | Oh | 371/46 |
| 5,982,818 | A | 11/1999 | Krueger et al. | 375/265 |
| 6,035,007 | A | 3/2000 | Khayrallah et al. | 375/341 |
| 6,038,269 | A | 3/2000 | Raghavan | 375/340 |
| 6,041,433 | A | 3/2000 | Kamada | 714/795 |
| 6,047,024 | A | 4/2000 | How | 375/229 |
| 6,215,744 | B1 * | 4/2001 | Mita et al. | 369/47.24 |
| 6,226,332 | B1 | 5/2001 | Agazzi et al. | 375/288 |
| 6,252,904 | B1 | 6/2001 | Agazzi et al. | 375/233 |
| 6,253,345 | B1 | 6/2001 | Agazzi et al. | 714/752 |
| 6,256,352 | B1 * | 7/2001 | Chang | 375/240.26 |
| 6,289,063 | B1 | 9/2001 | Duxbury | 375/348 |
| 6,356,586 | B1 | 3/2002 | Krishnamoorthy et al. | 375/233 |
| 6,408,420 | B1 | 6/2002 | Todoroki | 714/795 |
| 6,418,172 | B1 | 7/2002 | Raghavan et al. | 375/262 |

FOREIGN PATENT DOCUMENTS

| | | |
|---|---|---|
| JP | 02-215236 | 8/1990 |
| JP | 06-334692 | 12/1994 |
| JP | 08-116275 | 5/1996 |
| JP | 08-172366 | 7/1996 |
| JP | 09-148944 | 6/1997 |
| WO | WO97/11544 | 3/1997 |

OTHER PUBLICATIONS

Lee et al., *Digital Communications* (Kluwer Acad. Pubs.), 1988, pp. 34-42 and 319-345.

Lin et al., *Error Control Coding: Fundamentals and Applications* (Prentice-Hall), 1983, pp. 315-349.

Oppenheim et al., *Discrete-time Signal Processing* (Prentice-Hall), 1989, pp. 149-191.

Raheli et al., "Per-Survivor Processing: A General Approach to MLSE in Uncertain Environments," *IEEE Trans. Comm.*, Feb./Mar./Apr. 1995, pp. 354-364.

Sklar, *Digital Communications, Fundamentals and Applications* (Pearson Education), 1988, pp. 333-337.

Ungerboeck, "Trellis-Coded Modulation with Redundant Signal Sets, Part I: Introduction", *IEEE Communications Mag.*, Feb. 1987, pp. 5-11.

Ungerboeck "Trellis-Coded Modulation with Redundant Signal Sets, Part II: State of the Art", *IEEE Communications Mag.*, Feb. 1987, pp. 12-21.

Viterbi, "Error Bounds for Convolutional Codes and an Asymptotically Optimum Decoding Algorithm"; *IEEE Trans. Info. Theory*, Apr. 1967, pp. 260-269.

"1000BASE-T Physical Layer for Gigabit Ethernet", IEEE 802.3 document D1.0, Sep. 3, 1997, pp. 1-49.

"Fibre Distributed Data Interface (FDDI)—Token Ring Twisted Pair Physical Layer Medium Dependent (TP-PMD)", Amer. Nat'l Std. ANSI INCITS 263-1995 (R2000), formerly ANSI X3-263-1995, Sep. 25, 1995, 4 introductory pp. and pp. i-viii and 1-68.

"Physical layer specification for 1000 Mb/s operation on four pairs of Category 5 or better balanced twisted pair cable (1000BASE-T)", Supplement to Carrier Sense Multiple Access with Collision Detection (CSMA/CD) Access Method & Physical Layer Specifications, IEEE Draft P802.3ab/D4.1, Oct. 5, 1998, cover p. and pp. 40-i, 40-ii, 1.1-1.3, 22-1, 28-1, 32-1, 34-1, 42-1, 28B-1-28B-3, 28C-1, 28D-1, 30B-1, and 40-1-40-126.

* cited by examiner

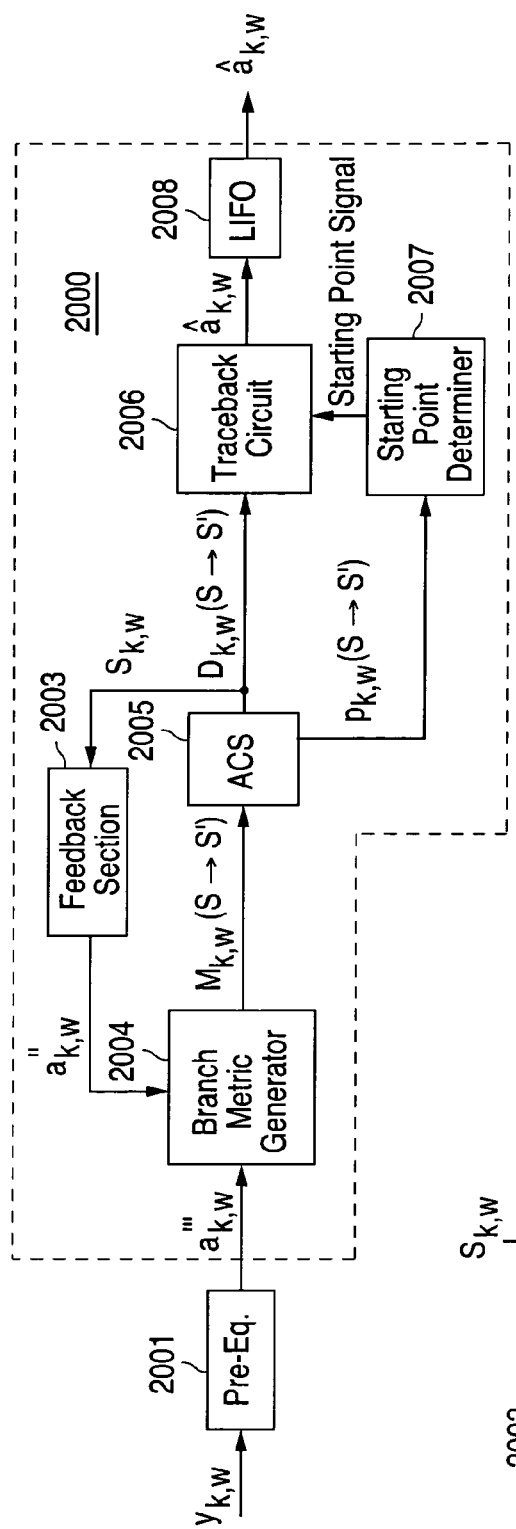
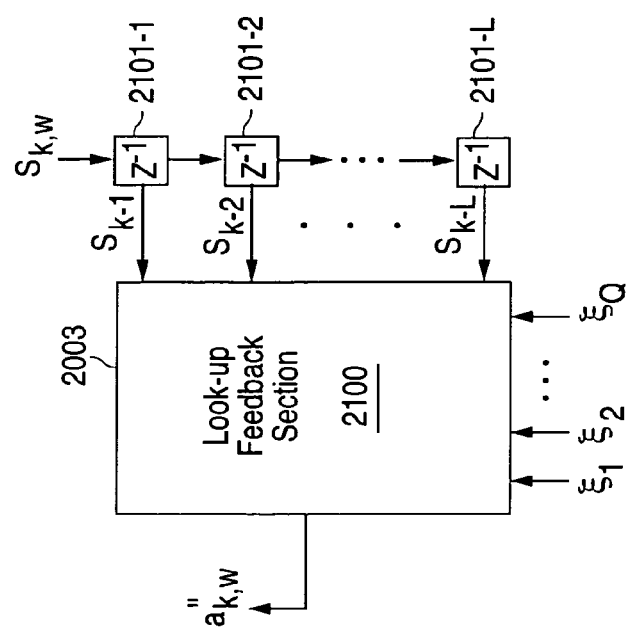
FIG. 20A
FIG. 20B

US 7,443,936 B1

SEQUENCE DETECTOR USING VITERBI ALGORITHM WITH REDUCED COMPLEXITY SEQUENCE DETECTION VIA STATE REDUCTION USING SYMBOL FAMILIES

CROSS-REFERENCE TO RELATED APPLICATIONS

This is a division of U.S. patent application Ser. No. 11/044,537, filed Jan. 27, 2005, now abandoned, which is a division of U.S. patent application Ser. No. 09/560,109, filed Apr. 28, 2000, now U.S. Pat. No. 7,050,517 B1.

BACKGROUND

1. Field of the Invention

This invention relates to digital communication systems and, more particularly, to a detection system and method for an Ethernet receiver.

2. Discussion of Related Art

The dramatic increase in desktop computing power driven by Intranet-based operations and the increased demand for time-sensitive delivery between users has spurred development of high-speed Ethernet LANs. 100BASE-TX Ethernet, using existing category-5 copper wire, and the newly developed 1000BASE-T Ethernet for gigabit per second (gigabit/s) transfer of data over category-5 copper wire require new techniques in high speed symbol processing. Gigabit/s transfer can be accomplished utilizing four twisted pairs and a 125 megasymbol per second (megasymbol/s) transfer rate on each pair where each symbol represents two bits.

Physically, data is transferred using a set of voltages where each voltage represents one or more bits of data. Each voltage in the set is referred to as a symbol and the whole set of voltages is referred to as a symbol alphabet. In gigabit/s transfer, for example, data is usually sent with a set of five voltage levels (PAM-5), each symbol representing two bits.

One system of transferring data at high rates is non-return-to-zero (NRZ) signaling. In NRZ, the symbol alphabet {A} is {−1, +1}. A logical "1" is transmitted as a positive voltage while a logical "0" is transmitted as a negative voltage. At 125 megasymbols/s, the symbol rate required for gigabit/s transfer over four category-5 wires, the pulse width of each symbol is 8 ns.

Another example of a modulation method for high speed symbol transfer is multilevel transmission-3 (MLT-3) encoding and involves a three-level system. (See American National Standard Information System, *Fibre Distributed Data Interface (FDDI)-Part: Token Ring Twisted Pair Physical Layer Medium Dependent (TP-PMD)*, ANSI X3.263: 199X.) The symbol alphabet {A} for MLT-3 is {−1, 0, +1}. In MLT-3 transmission, a logical "1" is transmitted by either a −1 or a +1 while a logic "0" is transmitted as a 0. A transmission of two consecutive logical "1"s does not require the system to pass through zero in the transition. A transmission of the logical sequence ("1, ", "0", "1") would result in transmission of the symbols (+1, 0, −1) or −1, 0, +1), depending on the symbols transmitted prior to this sequence. If the symbol transmitted immediately prior to the sequence was a +1, then the symbols (+1, 0, −1) are transmitted. If the symbol transmitted before this sequence was a −1, then the symbols (−1, 0, +1) are transmitted. If the symbol transmitted immediately before this sequence was a 0, then the first symbol of the sequence transmitted will be a +1 if the previous logical "1" was transmitted as a −1 and will be a −1 if the previous logical "1" was transmitted as a +1.

The detection system in the MLT-3 standard needs to distinguish between three voltage levels, instead of two voltage levels in a more typical two-level system. The signal to noise ratio required to achieve a particular bit error rate is higher for MLT-3 signaling than for two-level systems. The advantage of the MLT-3 system, however, is that the energy spectrum of the emitted radiation from the MLT-3 system is concentrated at lower frequencies and therefore more easily meets FCC radiation emission standards for transmission over twisted pair cables. Other communication systems may use a symbol alphabet having more than two voltage levels in the physical layer in order to transmit multiple bits of data using each individual symbol.

In Gigabit Ethernet over twisted pair Category-5 cabling, for example, data encoded according to the pulse amplitude modulation-5 (PAM-5) scheme can be transmitted over four twisted copper pairs at an individual twisted pair baud rate of 125 megabaud. In PAM-5, data is sent with five voltage levels, designated as symbol alphabet {A} equal to {−2, −1, 0, +1, +2}, although the values of the actual voltage levels may be different from those numbers. Each symbol, therefore, can be used to code more than one bit of data.

Any other modulation scheme for symbol coding can be utilized, including quadrature amplitude modulation (QAM). In QAM schemes, for example, the symbols are arranged on a two-dimensional (real and imaginary) symbol constellation (instead of the one-dimensional constellations of the PAM-5 and MLT-3 symbol alphabets).

There is a need for transmitters and receivers for receiving transmission over multiple twisted copper pairs using larger symbol alphabets (i.e., three or more symbols). There is also a need for transceiver (transmitter/receiver) systems that, while operating at high symbol rates, have low bit error rates.

SUMMARY

Accordingly, a receiver and detection method for receiving transmission of data over multiple wires using encoded data symbol schemes having multiple symbols is described. A receiver according to the present invention includes multiple detectors for detecting one symbol from each of the multiple wires simultaneously (i.e., multiple one-dimensional detectors), an equalizer coupled to each of the detectors for equalizing the symbol stream from each of the multiple wires, and a multi-dimensional error analyzer/decoder for simultaneously making hard decisions regarding the symbol output of the symbols transmitted over each of the multiple wires.

Individual symbols can have any modulation scheme, including those with multi-dimensional constellations. The terminology of detecting N-dimensional (N-D) symbols refers to the number of individual symbols detected in each clock cycle, and not to the dimension of the symbol constellation.

Each of the equalizers can be any equalizer structure, including linear or decision feedback equalizers. In one embodiment of the invention, the equalizers include sequence detection equalizers. In another embodiment of the invention, the equalizers include simplified decision feedback equalizers.

In another embodiment, the equalizer includes a sequence detection equalizer in combination with a linear equalizer or a decision feedback equalizer. In some embodiments, the sequence detection equalizer is a reduced state sequence detector. In some embodiments, the decision feedback equalizer is a simplified decision feedback equalizer.

In general, a transceiver according to the present invention can utilize any symbol alphabet. In some embodiments, a PAM-5 symbol alphabet is utilized.

Some embodiments of the invention can include an error analysis decoder. The receiver receives signals from N individual wires and, for each wire, includes a linear equalizer in combination with a one-dimensional (1-D) sequence detector. The N output signals from the N 1-D sequence detectors are input to a N-D decoder that makes a final decision on the N-D symbol. In some embodiments of the invention, the error analysis decoder operates with lattice encoding schemes. In some other embodiments of the invention, the error analysis decoder operates with a parity encoding scheme.

These and other embodiments of a transceiver system according to the present invention are further described below with reference to the following figures.

BRIEF DESCRIPTION OF THE FIGURES

FIG. 20A shows a sequence detector in combination with a decision feedback equalizer.

FIG. 20B shows an embodiment of the feedback section of the decision feedback equalizer shown in FIG. 20A that includes a simplified feedback section.

In the figures, components having similar functions are often labeled similarly.

DETAILED DESCRIPTION

Figure 1:
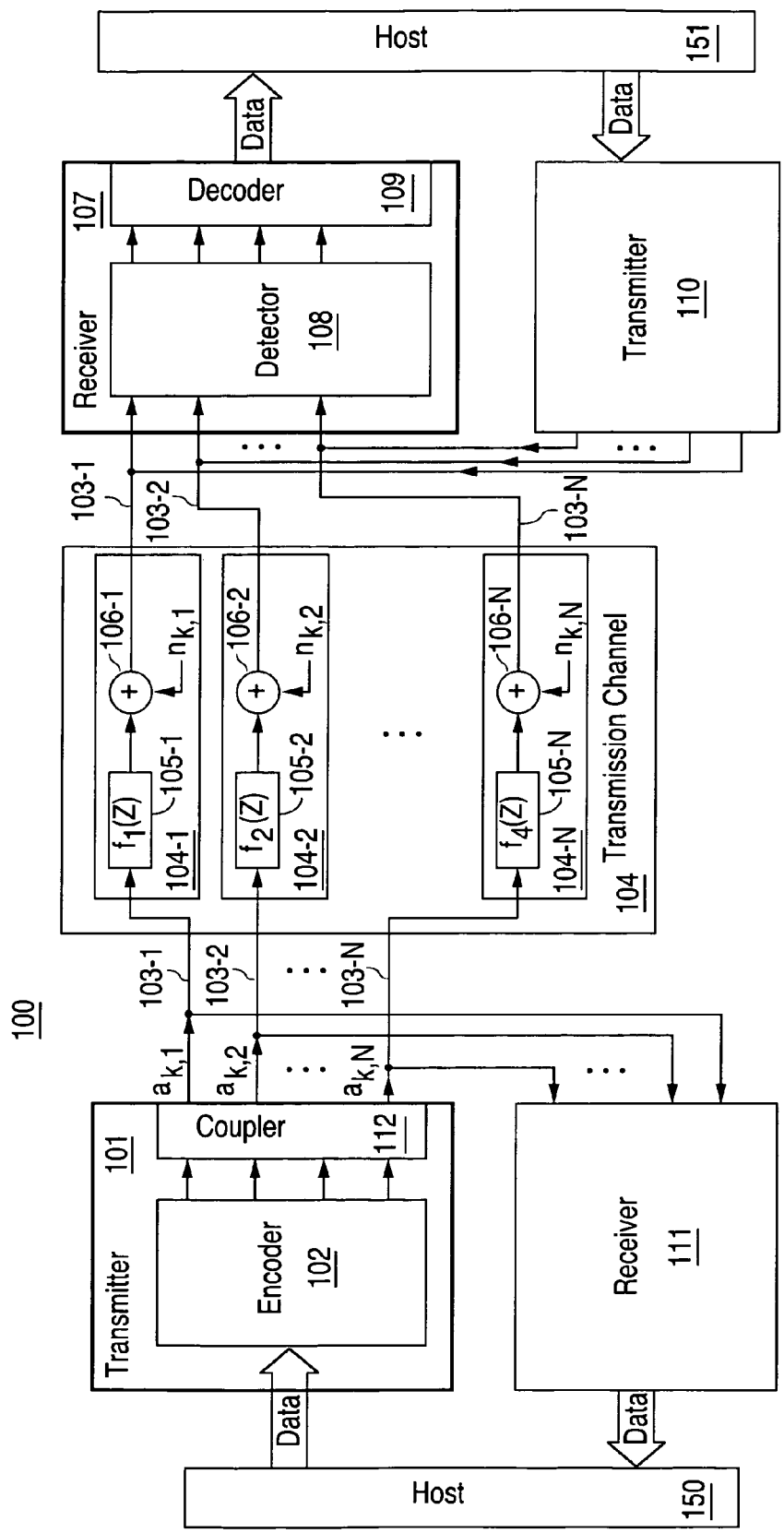
FIG. 1 shows a block diagram of a transceiver having multiple transport channels.

FIG. 1 shows a block diagram of a transceiver system 100 according to the present invention. Transceiver system 100 includes transmitter 101, receiver 107, and transport wires 103-1 through 103-N. A digital data stream is input to transmitter 101 by a first host 150. Transmitter 101 includes encoder 102, which encodes the data for transmission over transport wires 103-1 through 103-N. Transmission coupler 112 couples the encoded symbols received from encoder 102 to transmission channel 104. Data is output by transmission coupler 112 as symbols $a_{k,1}$ through $a_{k,N}$ over wires 103-1 through 103-N (collectively referred to as cable 103), respectively, which are coupled between transmitter 101 and receiver system 107. Wires 103-1 through 103-N can be of any transport medium or combination of transport media. Transport media include, for example, category-5 twisted copper pair, optical fiber and coax cable.

The index k in the present notation indicates the kth time cycle of the data transmission. The indicator N is an integer indicating the number of individual transport wires in cable 103. In general, any number of wires can be included in transceiver system 100. For gigabit/s transmission, N is usually 4, indicating a four wire connection between transmitter 101 and receiver system 107. Wires 103-1 through 103-4 are often twisted copper pairs.

Transmission channel 104 collectively represents cable 103 and any distortion of the signals that occurs between transmitter 101 and a receiver 107. Each of wires 103-1 through 103-N, along with output couplers of coupler 112 and input couplers of detector 108, distorts signals as indicated by the associated transmission channel 104-1 through 104-N, respectively. The signals through wires 103-1 through 103-N are distorted by channel functions $f_1(Z)$ through $f_N(Z)$, respectively, and are additionally subjected to random noise addition $n_{k,1}$ through $n_{k,N}$, respectively. Receiver 107 includes signal detector 108 and a decoder 109 and ultimately outputs a data stream which corresponds to the data stream entering transmitter 101.

In Gigabit Ethernet, transmission can be conducted on four twisted copper pairs (i.e., wires 103-1 through 103-4 in FIG. 1) in a full duplex fashion to achieve one gigabit per second throughput. See IEEE 802.3ab, Gigabit Long Haul Copper Physical Layer Standards Committee, 1997 (hereinafter "Gigabit Standard"). Transmitter 101 is coupled to first host 150 to receive data for transmission over transmission channel 104 to a second host 151 coupled to receiver 107. In general, first host 150 is further coupled to a receiver 111 for receiving data from transmission channel 104 and second host 151 is coupled to a transmitter 110 for sending data to transmission channel 104.

Although, in general, the detection system as described here is applicable to any scheme of data transmission (i.e., any symbol alphabet) over any number of transport wires (e.g., twisted copper pairs), for exemplary purposes many of the examples below specifically describe a PAM-5 symbol alphabet transmitted over four twisted copper pairs, as would be used in Gigabit Ethernet transmission over Category-5 twisted pair cabling. It should be recognized that other symbol alphabets and numbers of conductors can also be used and that one skilled in the art will recognize from this disclosure embodiments appropriate for other modulation schemes.

Encoder

According to the developed IEEE 802.3ab standard for Gigabit Ethernet transmission, the transmitted symbols on each of four conductors 103-1 through 103-4 are chosen from a five-level pulse amplitude modulation (PAM) constellation, i.e., PAM-5, with alphabet $\{A\}$ equal to $\{-2, -1, 0, +1, +2\}$. See Gigabit Standard. At each clock cycle, a single one-dimensional (1-D) symbol is transmitted on each wire. The four 1-D symbols, one on each of conductors 103-1 through 103-4, transmitted at a particular sample time k are considered to be a single 4-D symbol. In general, data entering transmitter 101 can be encoded into a N-D symbol, instead of into N 1-D symbols, by encoder 102. Encoder 102 may be any type of N-D encoder, including an N-D parity code encoder and an N-D trellis code encoder.

To achieve one gigabit/s communications, a Gigabit Ethernet transceiver needs to achieve a throughput of 250 megabits per second over each of four transport wires 103-1 through 103-4. Therefore, at a 125 megabaud rate, two bits must be transmitted at each sample time across each wire 103-j of cable 103, where j is an integer running from 1 to N which is 4 here. Although a PAM-5 system is applicable, a four-level PAM system, for example, does not provide redundancy which allows for error correction coding necessary to achieve a bit error rate (BER) of $10^{-10}$, as required by the Gigabit Ethernet standard. See Gigabit Standard.

In addition, extra channel symbols are needed to represent Ethernet control characters. Therefore, five-level PAM (PAM-5) with either a parity check code or trellis coding is often utilized in Gigabit Ethernet transmission. According to the Gigabit Standard, the trellis code is the only coding utilized. Alphabets having more than five-level 1-D symbols may also be utilized for gigabit/s transmission while achieving the required BER.

At 125 megabaud, each 4-D symbol needs to transmit at least eight bits. Therefore, 256 different 4-D symbols plus those required for control characters are required. By transmitting a 4-D PAM-5 symbol alphabet, there are $5^4=625$ possible symbols. This number of symbols allows for 100% redundancy in the data as well as for several control codes. Symbol alphabets having more than five symbols yield even greater redundancy. However, because of the difficulties in distinguishing between the higher number of voltage levels, higher error rates may occur in receiver detection systems such as detector 108 of FIG. 1.

The Gigabit Ethernet standard (see Gigabit Standard) allows a trellis code. In addition to a 4-D eight-state trellis code, a 4-D parity code has been proposed. The trellis code achieves 6 dB of coding gain over uncoded PAM-5 while the parity code achieves 3 dB of coding gain. While encoding, the choice between encoders can be encoded in a TX_CODING bit, which can be set to one for trellis coding. One skilled in the art will recognize that embodiments of the present invention are applicable to any error correction technique.

4-D Trellis Encoding

Figure 2:
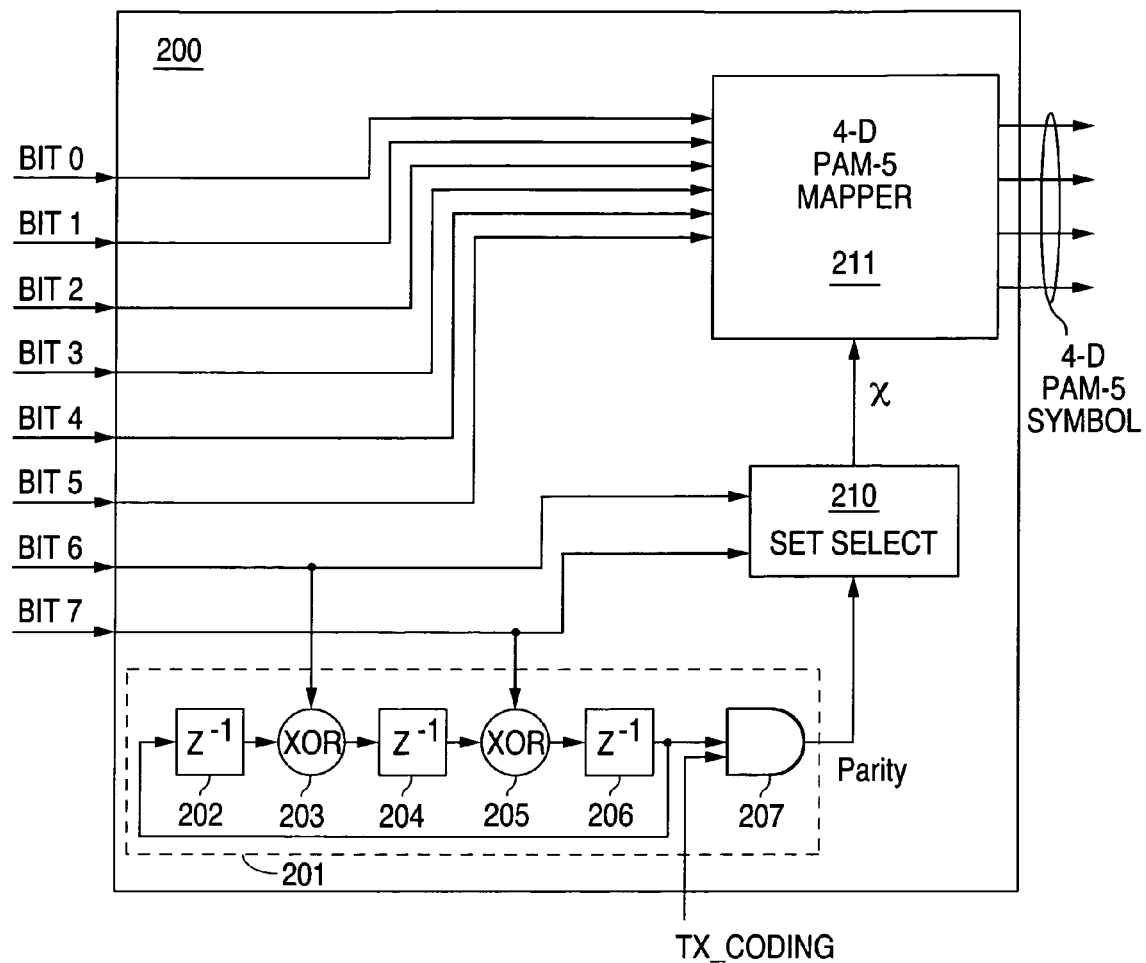
FIG. 2 shows a block diagram of an encoder capable of both trellis encoding and parity encoding.

Trellis encoding in a conventional 4-D eight-state code is described in Part II, Table IV, of G. Ungerboeck, "Trellis-Coded Modulation with Redundant Signal Sets, Part I: Introduction", *IEEE Communications Mag.*, vol. 25, no. 2, pp. 5-11, Feb. 1987, and "Trellis-Coded Modulation with Redundant Signal Sets, Part II: State of the Art", *IEEE Communications Mag.*, vol. 25, no. 2, pp. 12-21, Feb. 1987 (hereinafter collectively "Ungerboeck"). An embodiment of an eight-state trellis encoder 200 similar to that described in Ungerboeck is shown in FIG. 2. Trellis encoder 200 receives eight bits, bits 0 through 7, and outputs nine bits, bits 0 through 7 plus a parity bit, provided that TX_CODING is set to 1. The parity bit is produced from a rate 2/3 memory 3, systematic convolutional encoder 201.

Convolutional encoder 201 includes delays 202, 204 and 206, each of which delays its input signal by one clock cycle. The output signal from delay 202 is XORed (exclusive-ORed) with bit 6 in XOR 203 and input to delay 204. The output signal from delay 204 is XORed with bit 7 in XOR 205 and input to delay 206. The output signal from delay 206 is input to AND gate 207 and input to delay 202. AND gate 207 generates the parity bit, which is 1 one if the TX_CODING signal is 1 and the output signal from delay 206 is 1, and 0 (zero) otherwise. In embodiments that only utilize trellis coding (i.e., TX_CODING is always 1), AND gate 207 may be excluded from encoder 200 and the parity bit is the output signal from convolutional encoder 201.

The two input bits, bits 6 and 7, to convolutional encoder 201 and the parity bit produced by encoder 201 select one of eight subsets, $D_0$ through $D_7$, of the 4-D symbol alphabet. The nine output bits are mapped to one 4-D PAM-5 symbol which is then transmitted across cable 103 (FIG. 1) as four 1-D PAM-5 symbols.

Each 1-D PAM-5 symbol is a member of one of two families, X (odd) and Y (even). The odd family (or type) X contains the PAM-5 symbols $\{-1, +1\}$ and the even family (or type) Y contains the PAM-5 symbols $(-2, 0, +2)$. Table 1 shows a definition of the eight subsets $D_0$ through $D_7$ of the 4-D symbols The definition is based on the membership of 1-D PAM-5 symbols that are represented in each subset $D_P$ where subscript p is an integer varying from 0 to 7. Table 1 also shows the number of 4-D symbols in each subset $D_P$.

The notation describing each subset $D_P$ indicates the families of 1-D PAM-5 symbols on each of the four wires describing membership in that subset $D_P$. The notation XXYX, for example, indicates a set of four 1-D PAM-5 symbols where the first symbol is from type X, the second symbol is from type X, the third symbol is from type Y, and the fourth symbol is from type X. Therefore, conductor 103-1 (FIG. 1) carries a symbol of type X, conductor 103-2 carries a symbol of type X, conductor 103-3 carries a symbol of type Y and conductor 103-4 carries a symbol of type X.

TABLE 1

Mapping of 4-D symbols into subsets $D_0$ through $D_7$

| Subset | X Primary Code | Y Primary Code | Number of Symbols |
|---|---|---|---|
| $D_0$ | XXXX | YYYY | 97 |
| $D_1$ | XXXY | YYYX | 78 |
| $D_2$ | XXYY | YYXX | 72 |
| $D_3$ | XXYX | YYXY | 78 |
| $D_4$ | XYYX | YXXY | 72 |
| $D_5$ | XYYY | YXXX | 78 |
| $D_6$ | XYXY | YXYX | 72 |
| $D_7$ | XYXX | YXYY | 78 |

The parity bit and bits 6 and 7 are input to set select 210 (FIG. 2). Set select 210 determines a particular subset selection p, indicating that subset $D_P$ of subsets $D_0$ through $D_7$ has been selected. In one embodiment, subset selection p is determined according to the formula $$p = 4*BIT6 + 2*BIT7 + 1*Parity, \quad (1)$$

where BIT6 is bit 6, BIT7 is bit 7, and Parity is the parity bit.

A point within subset $D_P$ is chosen by the six least significant bits, bits 0 through 5, of the input. Bits 0 through 5 are input to a 4-D PAM-5 mapper 211 along with the output χ of set select 210. 4-D PAM-5 mapper 211 determines the 4-D PAM-5 symbol within subset $D_P$ which represents the eight input bits, bits 0 through 7, and the parity bit. Each subset $D_P$ contains more than the 64 points required to encode the least significant six bits, bits 0 through 5. These additional points are either used as control characters or not used at all.

The subset mapping shown in Table 1 is chosen such that the squared Euclidean distance between any pair of points in the same subset $D_P$ is greater than or equal to four (4). For example, the squared distance between two points in subset $D_0$ can be expressed as $(X_{11}-X_{12})2 + (X_{21}-X_{22})2 + (X_{31}-X_{32})2 + (X_{41}-X_{42})2$ or as $(Y_{11}-Y_{12})2 + (Y_{21}-Y_{22})2 + (Y_{31}-Y_{32})2 + (Y_{41}-Y_{42})2$. Because $X_{ij}=+1$ or $-1$ and $Y_{ij}=+2, 0,$ or $-2$, the shortest squared distance is $(1+1)2 = (2-0)2 = 4$, which occurs when only one value differs between the two points. In addition, the squared Euclidean distance between points in different even-numbered subsets $D_0, D_2, D_4,$ and $D_6$ is greater than or equal to 2 and the squared Euclidean distance between points in different odd-numbered subsets $D_1, D_3, D_5,$ and $D_7$ is likewise greater than or equal to 2. As also can be seen from Table 1, even-numbered subsets ($D_0, D_2, D_4,$ and $D_6$) have an even number of symbols of type X and an even number of symbols of type Y while odd-numbered subsets ($D_1, D_3, D_5,$ and $D_7$) have an odd number of symbols of type X and an odd number of symbols of type Y.

Figure 3:
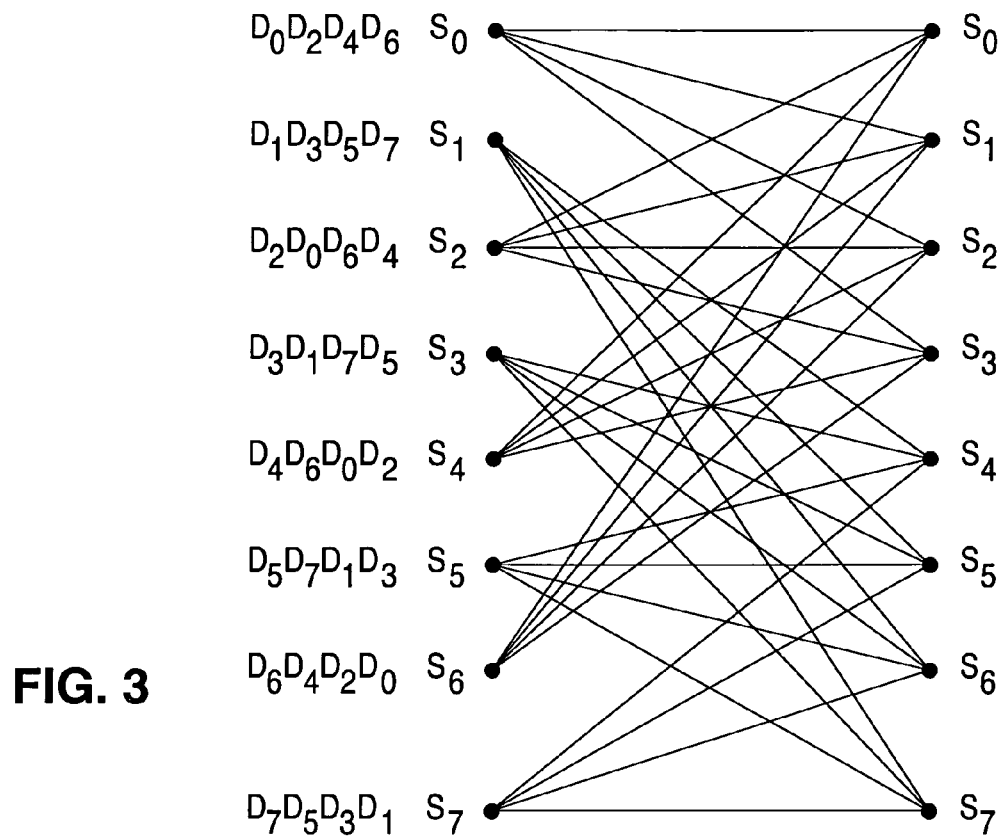
FIG. 3 shows a trellis diagram for state transitions among subsets of PAM-5 four-dimensional (4-D) symbols.

FIG. 3 shows a trellis diagram resulting from the convolutional encoder shown in FIG. 2. The states $S_0$ through $S_7$ of the trellis in FIG. 3 are determined by the bits in delay elements 202, 204 and 206. The state $S_q$ is determined by calculating q as 4*(the output signal from delay 202)+2*(the output signal from delay 204)+1*(the output bit from delay 206). The subsets $D_P$ are determined by the transition from one state to another as shown in FIG. 3. The subsets $D_P$ are given in Table 1.

As shown in FIG. 3, all transitions out of a particular state are either all even subsets ($D_0, D_2, D_4,$ and $D_6$) or all odd subsets ($D_1, D_3, D_5,$ and $D_7$). Similarly, the transitions into a particular state are either all even subsets or all odd subsets. The minimum squared distance between outgoing transitions, therefore, is equal to two (2) and the minimum squared distance between incoming transitions is also two (2).

As a result, the minimum squared distance between valid sequences is greater than or equal to 4, which can be seen from the fact that any two paths that originate from the same node and end at the same node, but diverge at some point in the middle, must then converge at a later time. Both the divergence and the convergence have a squared distance of at least 2. The total squared distance must thus be at least 4. In the case where these two paths do not diverge, then they must contain different points from the same subset $D_P$. Because the minimum squared distance between points in the same subset $D_P$ is equal to 4, the minimum squared distance between valid sequences is 4. As is conventionally known, a coding gain of 6 dB with respect to uncoded PAM-5 constellations is therefore experienced.

4-D Parity Code

The 4-D parity code can also be transmitted using the same encoder, encoder 200 of FIG. 2. To do so, the TX_CODING bit is set to zero. As a result, the parity bit produced by convolutional encoder 201 is always 0. Therefore, set select 211 always chooses an even subset, i.e., $D_0, D_2, D_4,$ or $D_6$. The minimum squared Euclidean distance between any two 4-D symbols, therefore, is 2 and a coding gain of 3 dB is experienced over uncoded PAM-5.

Transmitter Coupler

Transmitter coupler 112 (FIG. 1) couples the N-D symbol from encoder 102 to transmission channel 104. In some embodiments, coupler 112 can include pre-coding of signals to each of lines 103-1 through 103-N. Some pre-coding may at least partially overcome the expected intersymbol interference effects experienced in transmission channels 104-1 through 104-N, respectively. However, some pre-coding, such as partial response shaping, for example, may actually add to the intersymbol interference effects.

Coupler 112 converts symbols received from encoder 102 to appropriate voltages for transmission to receiver 107 through transmission channel 104. In many embodiments of PAM-5 transmission, for example, those voltages are (−1, −½, 0, +½, +1) volts corresponding to the PAM-5 symbols (−2, −1, 0, 1, 2), respectively.

Transmission Channel Characteristics

An inputs symbol stream $\{a_{k,1}\}$ through $\{a_{k,N}\}$ is input to each of wires 103-1 through 103-N, respectively, of transmission channel 104 (FIG. 1) by transmitter 101. Wires 103-1 through 103-N can be twisted copper pair, or some other transmission medium such as coaxial cable or optical fiber. Transmission channel 104 represents the effects that wires 103-1 through 103-N, transmission coupler 112 and receiver couplers in detector 108 have on the input symbol streams $\{a_{k,1}\}$ through $\{a_{k,N}\}$ in transmission between transmitter 101 and receiver 107. Each transmission channel 104-1 through 104-N includes a corresponding one of wires 103-1 through 103-N, respectively, for the symbol stream $\{a_{k,1}\}$ through $\{a_{k,N}\}$ respectively.

Figure 4:
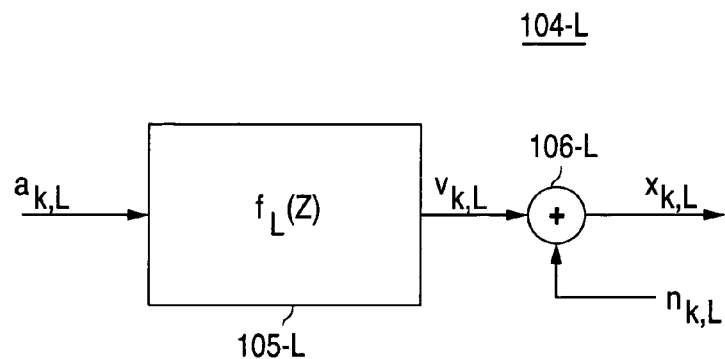
FIG. 4 shows a block diagram of a model of transmission channel between a transmitter and a receiver system.

FIG. 4 shows a single transmission channel 104-L that represents the Lth one of transmission channels 104-1 through 104-N, where L can be any one of 1 through N. The symbol $a_{k,L}$, representing the symbol transmitted on wire 103-L in the kth time period, is transmitted through transmission channel 104-L. The symbol stream $\{a_{k,L}\}$ of FIG. 4 can be NRZ, MLT-3, PAM-5 or any other symbol alphabet and modulation. The transmitted symbols in the sequence $\{a_{k,L}\}$ are members of the symbol alphabet $\{A\}$. In the case of five-level PAM signaling, the symbol alphabet $\{A\}$ is given by $\{-2, -1, 0, +1, +2\}$.

The channel response 105-L is represented by the channel function $f_L(Z)$. In FIG. 1, each of conductors 103-1 through 103-N can experience a different channel function $f_1(Z)$ through $f_N(Z)$, respectively. The addition of random noise $n_{k,L}$ in FIG. 4 is represented by adder 106-L. Again, in FIG. 1 each of conductors 103-1 through 103-N experiences a different random noise $n_{k,1}$ through $n_{k,N}$, respectively. The signal $x_{k,L}$ subjected to channel distortion, random noise, and a flat signal loss is received by receiver 107.

For the sake of simplicity, a baseband transmission system is assumed, although the techniques shown are easily extended to a passband transmission system. (See E. A. LEE AND D. G. MESSERSCHMITT, DIGITAL COMMUNICATIONS (1988).) It is also assumed that the channel model includes the effects of transmit and receive filtering. In addition, the transmission channel is assumed to be linear in that two overlapping signals simply add as a linear superposition. The Z transform (see A. V. OPPENHEIM & R. W. SCHAFER, DISCRETE-TIME SIGNAL PROCESSING (1989).) of the sampled transmission channel 104-L shown in FIG. 4 is given by the channel function polynomial $$f_L(Z) = f_{0,L} + f_{1,L}Z^{-1} + \ldots f_{j,L}Z^{-j} + f_{R,L}Z^{-R}, \quad (2)$$

where $f_{0,L}, \ldots, f_{j,L}, \ldots f_{R,L}$ are the polynomial coefficients, and $Z^{-1}$ represents a one period delay. The coefficient $f_{j,L}$ represents the dispersed component of the (k−j)th symbol present in the $a_{k,L}$ th symbol and R is a cut-off integer such that $f_{j,L}$ for j>R is negligible. The polynomial $f_L(Z)$ represents the Z-transformation of the frequency response of the transmission channel. (See A. V. OPPENHEIM & R. W. SCHAFFER, DISCRETE-TIME SIGNAL PROCESSING (1989).)

The noiseless output $v_{k,L}$ of the channel at sample time k is given by $$v_{k,L} = f_{0,L}a_{k,L} + f_{1,L}a_{k-1,L} + \ldots + f_{R,L}a_{k-R,L}. \quad (3)$$

where, without loss of generality, $f_{0,L}$ can be assumed to be 1. Thus, the channel output signal at time k depends, not only on transmitted data at time k, but on R past values of the transmitted data. This effect is known as "intersymbol interference" (ISI). (See LEE & MESSERSCHMITT.) The ISI length of the transmission channel defined by Equations 2 and 3 is R, the number of past symbols contributing to ISI.

Intersymbol interference is a result of the dispersive nature of the communication channel. The IEEE LAN standards require that systems be capable of transmitting and receiving data through at least a 100 meter cable. In many instances, a single symbol may affect symbols throughout the transmission cable.

The noise element of the input signal is represented by the sequence $\{n_{k,L}\}$. Therefore, the noisy output signal $x_{k,L}$ from transmission channel 104-L is given by $$x_{k,L} = v_{k,L} + n_{k,L}. \quad (4)$$

where the noise samples $\{n_{k,L}\}$ are assumed to be independent and identically distributed Gaussian random variables (see LEE & MESSERSCHMITT) with variance equal to $\sigma^2$.

Receiver

Figure 5A:
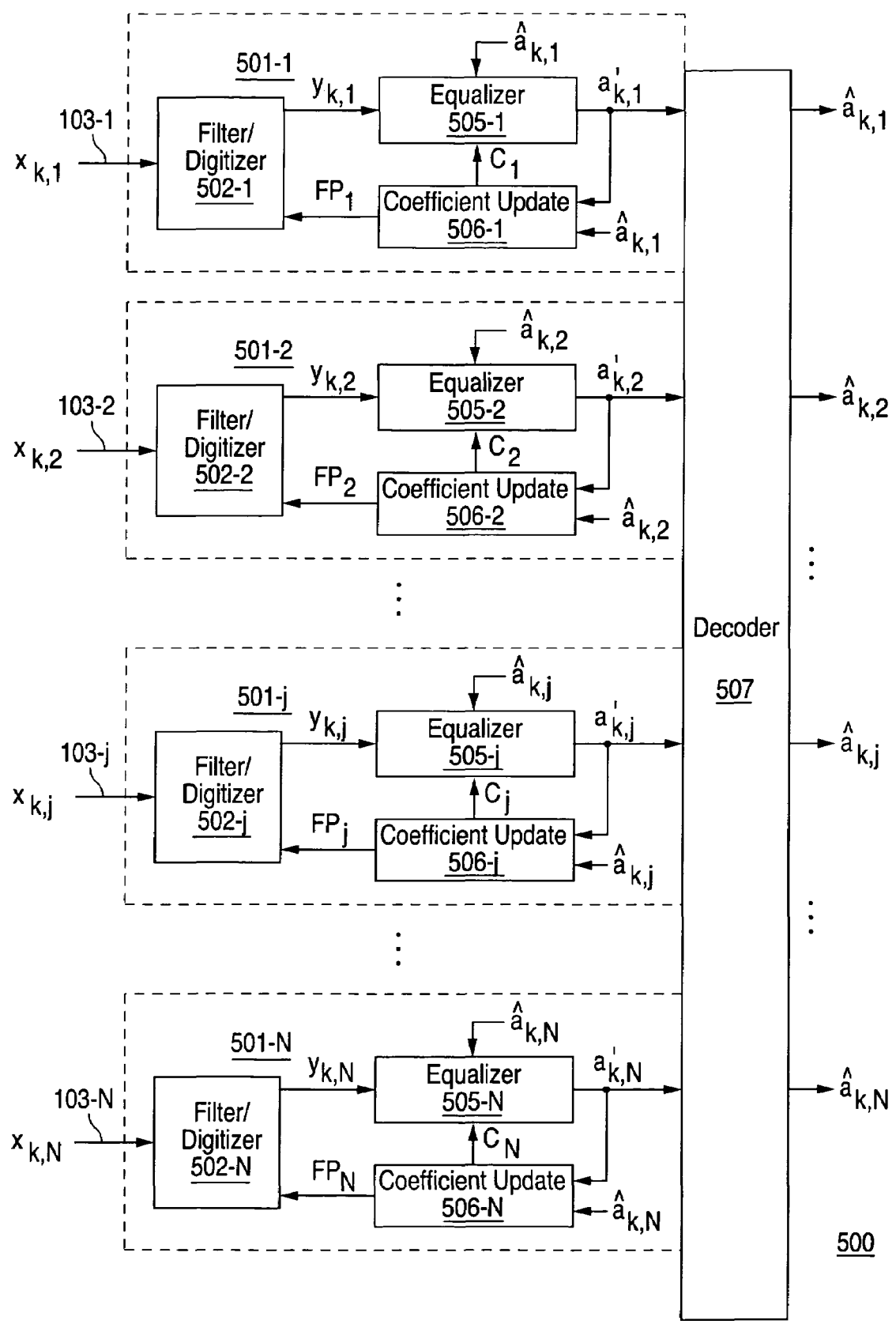
FIG. 5A shows a block diagram of an N-D receiver system according to the present invention.

FIG. 5A shows a block diagram of an embodiment of a baseband receiver system 500 according to the present invention. Other receiver systems may also utilize aspects of the present invention. Embodiments of receiver system 500 may include any number of transport wires 103-1 through 103-N (with associated transmission channels 104-1 through 104-N, respectively) carrying input signal streams $x_{k,1}$ through $x_{k,N}$, respectively.

Receiver system 500 includes receivers 501-1 through 501-N, one for each of lines 103-1 through 103-N, respectively. Receiver 501-j, an arbitrarily chosen one of receivers 501-1 through 501-N, includes filter/digitizer 502-j, equalizer 505-j, and coefficient update 506-j. Signal $x_{k,j}$ from wire 103-j is received by filter/digitizer 502-j. Filter/digitizer 502-j filters, digitizes and amplifies the signal $x_{k,j}$ and outputs a signal $y_{k,j}$. Equalizer 505-j receives the signal $y_{k,j}$, equalizes it to remove the effects of intersymbol interference, and outputs a signal $a'_{k,j}$, which is the output signal for receiver 501-j. Filter/digitizer 502-j can be arranged to include filters that partially remove the ISI from signal $x_{k,j}$ before digitizing the signal. See, e.g., U.S. patent application Ser. No. 09/561,086, filed Apr. 28, 2000, Manickam et al., assigned to the same assignee as the present application, now U.S. Pat. No. 7,254, 198 B1, herein incorporated by reference in its entirety.

Coefficient update 506-j inputs decided-on symbols $â_{k,j}$ and other parameters and adaptively chooses parameters $FP_j$ and $C_j$ respectively for filter/digitizer 502-j and equalizer 505-j (e.g., amplifier gain, multiplier coefficients, filter parameters, echo cancellation, near end crosstalk cancellation, and timing parameters).

One skilled in the art will recognize that each of receivers 501-1 through 501-N can be different. That is, each of filters/digitizers 502-1 through 502-N and equalizers 505-1 through 505-N can be individually matched to receive input signals from the corresponding one of wires 103-1 through 103-N.

Figure 5B:
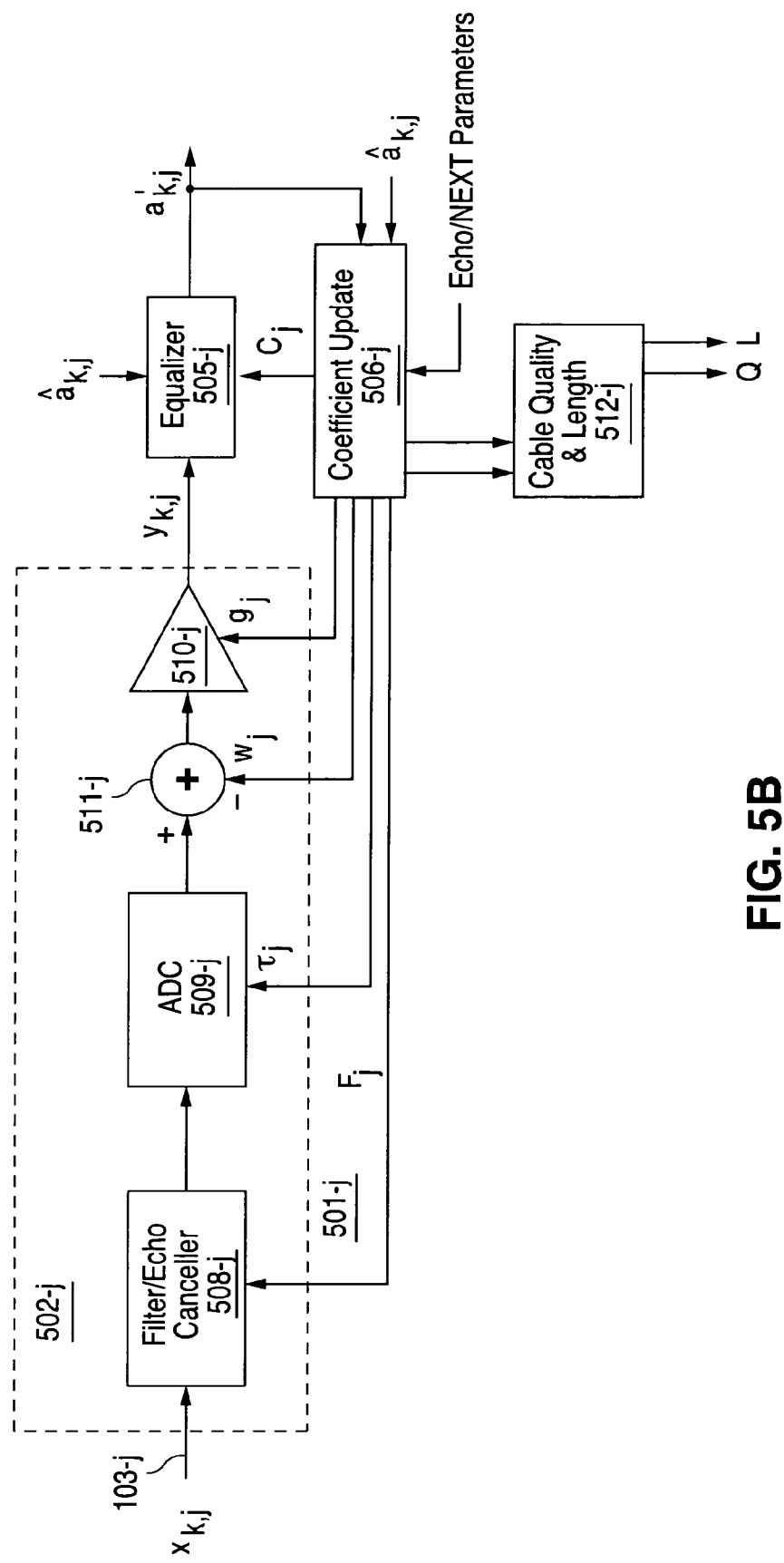
FIG. 5B shows a block diagram of a receiver according to the present invention for the N-D receiver system of FIG. 5A.

FIG. 5B shows a representative example of receiver 501-j. Receiver 501-j is one of receivers 501-1 through 501-N. Receiver 501-j includes filter/digitizer (or receiver/digitizer) 502-j in series with equalizer 505-j. Receiver/digitizer 502-j includes, in series, filter/echo canceller 508-j, analog-to-digital converter (ADC) 509-j, and amplifier 510-j. One skilled in the art will recognize that the order of these components can be altered from that shown in FIG. 5B. For example, amplifier 510-j can be implemented before filter/echo canceller (or simply filter) 508-j, or filter 508-j can be implemented, completely or partially, digitally after ADC 509-j.

Parameters to control the components of receiver 501-j can be adaptively chosen by coefficient update 506-j. Coefficient update 506-j adaptively determines the equalizer coefficients of equalizer 505-j, the gain $g_j$ of amplifier 510-j, the timing coefficient $\tau_j$ of ADC 509-j, and filter coefficients for filter 508-j. In some embodiments, coefficient update 506-j can calculate a baseline wander correction signal $w_j$ which is subtracted from the output sample of ADC 509-j at baseline wander correction adder 511-j. Baseline wander correction is discussed in U.S. patent application Ser. No. 09/151,525, filed Sep. 11, 1998, Raghavan, assigned to the same assignee as the present application, now U.S. Pat. No. 6,415,003, herein incorporated by reference in its entirety.

Some embodiments of receiver 501-j include a cable quality and length indicator 512-j that indicates a wire length L and wire quality Q.

Echo noise, which is a result of impedance mismatches in the duplex link causing some of the transmitted signal energy to be reflected back into a receiver, and near end crosstalk (NEXT) noise, which is caused by the interference from a transmitter, i.e., transmitter 110 (FIG. 1), physically located adjacent to receiver 107, can be canceled through adaptive algorithms in filter 508-j. The cancellation of echo noise and NEXT noise is nearly complete because receiver system 500 has access to the data transmitted by an adjacent transmitter (transmitter 110 in FIG. 1). Coefficient update 506-j, therefore, may input parameters from a decoder/slicer, host 151 or other controller in order to adjust filter 508-j to cancel echo and NEXT noise. Note that, in FIG. 1, transmitter 101 may also be adjacent to an accompanying receiver 111.

Filter 508-j can also include an anti-aliasing filter. An anti-aliasing filter prevents aliasing by passing the input signal, received from wire 103-j, through a low pass filter to reject out-of-band noise. As such, any conventional anti-aliasing filter can be utilized as an anti-aliasing filter portion of filter 508-j.

The analog-to-digital converter (ADC) 509-j samples and holds the input signal for the duration of the symbol period T, which in one embodiment of the invention is 8 ns. In general, embodiments of the invention can utilize any symbol period.

Techniques for analog-to-digital conversion that can be used in ADC 509-$j$ are well known. The digitized signals in receiver 501-$j$ are interchangeably referred to in this disclosure as samples or signals.

Amplifier 510-$j$ amplifies the samples received from wire 103-$j$ through transmission channel 104-$j$ in order to correct for signal loss during transmission. The gain $g_j$ of amplifier 510-$j$ can be adaptively chosen by coefficient update 506-$j$ in order to optimize the operation of receiver 501-$j$. One of ordinary skill in the art will recognize that digital amplifier 510-$j$ can be located anywhere in receiver 501-$j$ between ADC 509-$j$ and equalizer 505-$j$. In general, amplifier 510-$j$ can also be an analog amplifier located anywhere between input channel 104-$j$ and ADC 509-$j$.

In some embodiments, coefficient update 506-$j$ can also calculate the length and quality of wire 103-$j$. Cable length and quality determination is discussed in U.S. patent application Ser. No. 09/161,346, filed Sep. 25, 1998, Raghavan et al., assigned to the same assignee as the present application, now U.S. Pat. No. 6,438,163, herein incorporated by reference in its entirety.

The output sample $v_{k,j}$ from receiver/digitizer 502-$j$ is input to equalizer 505-$j$. Equalizer 505-$j$ can be any kind of equalizer structure. Types of equalizer structures include linear equalizers, decision feedback equalizers, and sequence detection equalizers. Equalizers of these types for 100 or 1000 BASE-T Ethernet over category-5 wiring, 24 gauge twisted copper pair, are described in U.S. patent application Ser. No. 08/974,450, filed Nov. 20, 1997, Raghavan, assigned to the same assignee as the present application, now U.S. Pat. No. 6,038,269, herein incorporated by reference in its entirety; and U.S. patent application Ser. No. 09/020,628, filed Feb. 9, 1998, Raghavan, assigned to the same assignee as the present application, now U.S. Pat. No. 6,115,418, herein incorporated by reference in its entirety.

Additionally, receivers of the type described above as receivers 501-1 through 501-N are further described in U.S. patent application Ser. No. 09/151,525 and 09/161,346, both cited above.

In receiver system 500 of FIG. 5A, the output samples $a'_{k,1}$ through $a'_{k,N}$ from receivers 501-1 through 501-N, respectively, are input to decoder 507. Decoder 507 decides on a N-D symbol based on the samples from receivers 501-1 through 501-N. Each of the N 1-D symbols of the N-D symbol is the result of the N-D symbol pick in decoder 507.

Figure 6:
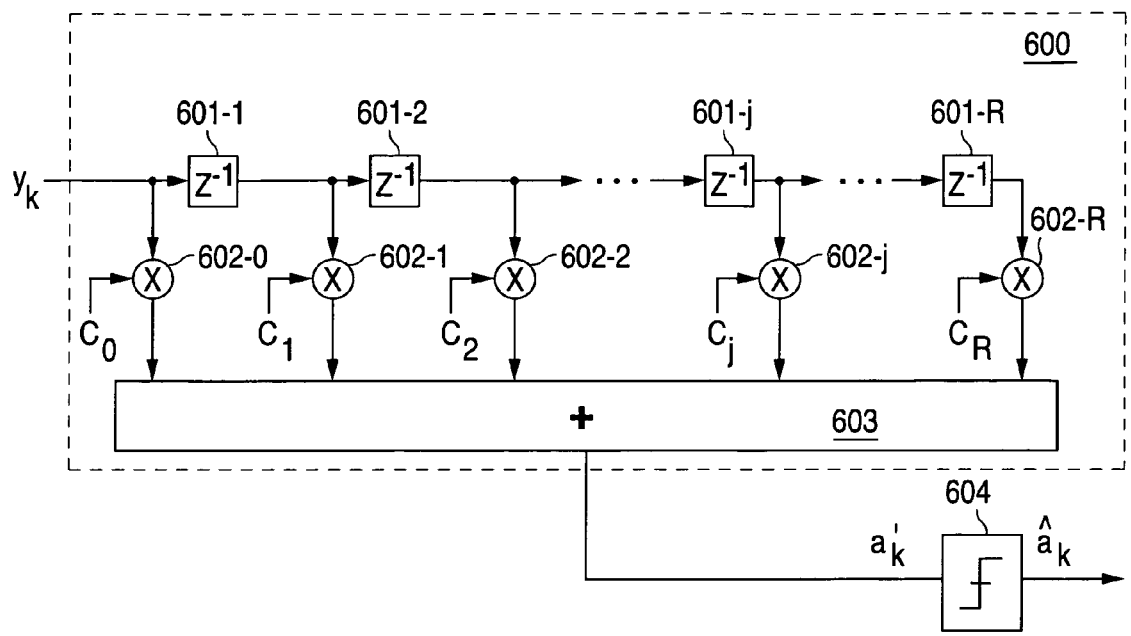
FIG. 6 shows a block diagram of a linear equalizer.

FIG. 6 shows a block diagram of a linear equalizer 600 having R+1 multipliers, where R here is any integer greater than or equal to 0. Linear equalizer 600 includes delays 601-1 through 601-R connected in series. The output samples from delays 601-1 through 601-R are also input to multipliers 602-1 through 602-R, respectively. The input sample $y_k$ to equalizer 600 is input to multiplier 602-0. The input samples to multipliers 602-0 through 602-R are multiplied by multiplier coefficients $C_0$ through $C_R$, respectively, and summed in adder 603. Multiplier coefficients $C_0$ through $C_R$ can be adaptively chosen to optimize the performance of equalizer 600. In FIG. 5B, for example, coefficient update 506-$j$ adaptively chooses equalizer parameters for equalizer 505-$j$.

Equalizer 600 (FIG. 6) executes the transfer function $$T = C_0 + C_1 Z^{-1} + \ldots + C_j Z^{-j} + \ldots + C_R Z^{-R}. \quad (5)$$

For simplicity, the wire designation L has been neglected. It is understood that each transmission channel includes a separate equalizer, which can be a unit of equalizer 600 having its own transfer function T.

In a zero-forcing linear equalizer (ZFLE), the transfer function T is the inverse of the frequency response f(Z) of the channel (see Equation 2 with the wire designation L neglected). In a minimum mean squared error based linear equalizer (MMSE-LE), the transfer function is arranged to optimize the mean squared error between the transmitted data signal and the detected data symbols. A compromise, then, is found between the un-canceled ISI and the noise variance at the output terminal of the equalizer. (See B. SKLAR, DIGITAL COMMUNICATIONS, FUNDAMENTALS AND APPLICATIONS (PTR Prentice Hall, Englewood Cliffs, N.J., 1988).)

The output sample $a'_k$ from linear equalizer 600, executing transfer function T, is given by $$a'_k = C_0 y_k + C_1 y_{k-1} + \ldots + C_j y_{k-j} + \ldots + C_R y_{k-R}. \quad (6)$$

where $C_0$ through $C_R$ are the equalizer coefficients, $y_{k-j}$ is the input signal to equalizer 600 during the time period that is j periods before the kth period, and k again represents the current time period.

The output sample $a'_k$ from equalizer 600 is usually input to a sliver 604 which decides, based on its input sample $a'_k$, what symbol $\hat{a}_k$ was transmitted during time period k. The symbol $\hat{a}_k$ is chosen from the symbol alphabet used for transferring data that is closest to input signal $a'_k$.

A linear equalizer can be implemented using either parity coding or trellis coding systems. When linear equalization is used with parity coding, a separate linear equalizer is used on each transport wire. In FIG. 5A, for example, each of equalizers 505-1 through 505-N can include a linear equalizer.

Figure 7:
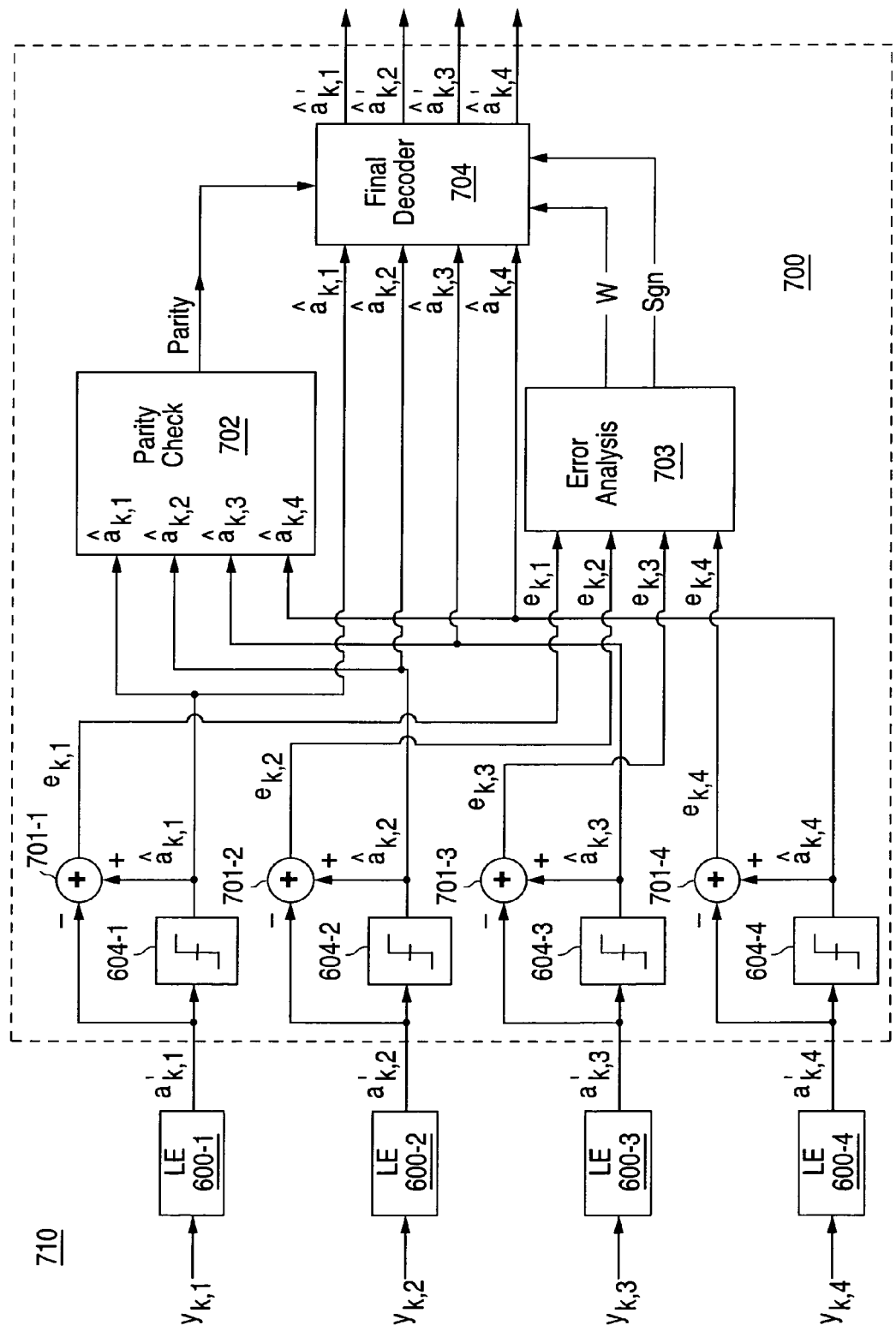
FIG. 7 shows a block diagram of the equalizer and decoder portions of a 4-D receiver system that includes linear equalizers and parity encoding.

As an example, FIG. 7 shows a portion of a 4-D receiver system, 710 which includes 4-D decoder 700 and linear equalizers 600-1 through 600-4. Linear equalizers 600-1 through 600-4 provide equalization for channels 104-1 through 104-4, respectively. Decoder 700 can be any type of decoder including a parity code decoder and a 4-D trellis decoder. As an example, decoder 700 is shown as a parity code decoder in FIG. 7. Also, although a 4-D decoder is shown in FIG. 7, it is understood that receiver system 710 can generally have any number of parallel input signals.

The input samples to linear equalizers 600-1 through 600-4 are the output samples $y_{k,1}$ through $y_{k,4}$ from receivers/digitizers 502-1 through 502-4 (FIG. 5B), respectively. The subscripts 1 through 4 reference the four wires 103-1 through 1-3-4, respectively. The output samples $a'_{k,1}$ through $a'_{k,4}$ from linear equalizers 600-1 through 600-4, respectively, are input to slicers 604-1 through 604-4, respectively. In FIG. 7, slicers 604-1 through 604-4 are 1-D slicers. If PAM-5 symbol coding is utilized, then slicers 604-1 through 604-4 are 1-D PAM-5 slicers that each output the PAM-5 symbol closest to input sample $a'_{k,1}$ through $a'_{k,4}$, respectively.

The output symbols $\hat{a}_{k,1}$ through $\hat{a}_{k,4}$ from slicers 604-1 through 604-4, respectively, are input to parity check 702. Additionally, each of samples $a'_{k,1}$ through $a'_{k,4}$ is subtracted from the corresponding one of symbols $\hat{a}_{k,1}$ through $\hat{a}_{k,4}$, respectively, in adders 701-1 through 701-4, respectively, to calculate errors $e_{k,1}$ through $e_{k,4}$, respectively. In general the error signal $e_{k,i}$, where i is 1 through 4, is then given by $$e_{k,i} = a'_{k,i} - \hat{a}_{k,i} \quad (7)$$

The parity of the 4-D symbol that results from the four 1-D symbols is checked in parity check 702. In parity coding, the 4-D symbol is chosen from an even subset of all 4-D symbols. Therefore, if PAM-5 coding is used, there are an even number of PAM-5 symbols from family X (odd symbols) and an even number from family Y (even symbols). Parity check 702 checks the parity of the four input symbols $\hat{a}_{k,1}$ through $\hat{a}_{k,4}$ by determining whether the sum of the four symbols is even or not. An odd parity indicates that there is an error in at least one of the decided-on symbols $\hat{a}_{k,1}$ through $\hat{a}_{k,4}$. The result of the parity check is input to final decoder 704.

The calculated error signals $e_{k,1}$ through $e_{k,4}$ are input to error analysis 703. Error analysis 703 determines which of the four error signals $e_{k,1}$ through $e_{k,4}$ is greatest and the sign of that error. Error analysis 703 outputs a sign signal Sgn and an identifier W for the symbol having the greatest error.

Final decoder 704 inputs the parity signal from parity check 702, the four 1-D PAM-5 symbols $\hat{a}_{k,1}$ through $\hat{a}_{k,4}$ from slicers 604-1 through 604-4, respectively, the identifier W for the symbol having the greatest error, and the sign Sgn of that error and outputs the PAM-5 symbols $\hat{e}'_{k,1}$ through $\hat{a}'_{k,4}$ in response. If the parity is even, the 4-D symbol defined by 1-D symbols $\hat{a}_{k,1}$ through $\hat{a}'_{k,4}$ is then given by symbols $\hat{a}_{k,1}$ through $\hat{a}_{k,4}$, respectively. The parity coding scheme, therefore, can pass erroneous 4-D symbols containing simultaneous errors in two of the 1-D symbols.

If the parity is odd, however, the results of error analysis 703 are used to correct the output symbols. Because the symbol having the greatest error is the one that is most likely incorrect, the value of the symbol indicated by identifier W is corrected by either increasing or decreasing that symbol by one symbol in the symbol alphabet in response to the sign Sgn of the error (in this example, increased for a positive sign and decreased for a negative sign). The new set of four symbols, the three uncorrected symbols having the lowest error and the corrected symbol, is output as the 4-D symbol defined by 1-D symbols $\hat{a}'_{k,1}$ through $\hat{a}'_{k,4}$.

Although simple to implement, the primary disadvantage of a linear equalizer is that, while removing the ISI from the input signal, it may cause the random noise to be enhanced. This is especially true in twisted copper pair channels where the frequency response of the channel has significant attenuation across the transmitted signal bandwidth. Hence, in twisted-pair channels, such as is used with Gigabit Ethernet, linear equalization often does not perform well enough to be practical.

Figure 8:
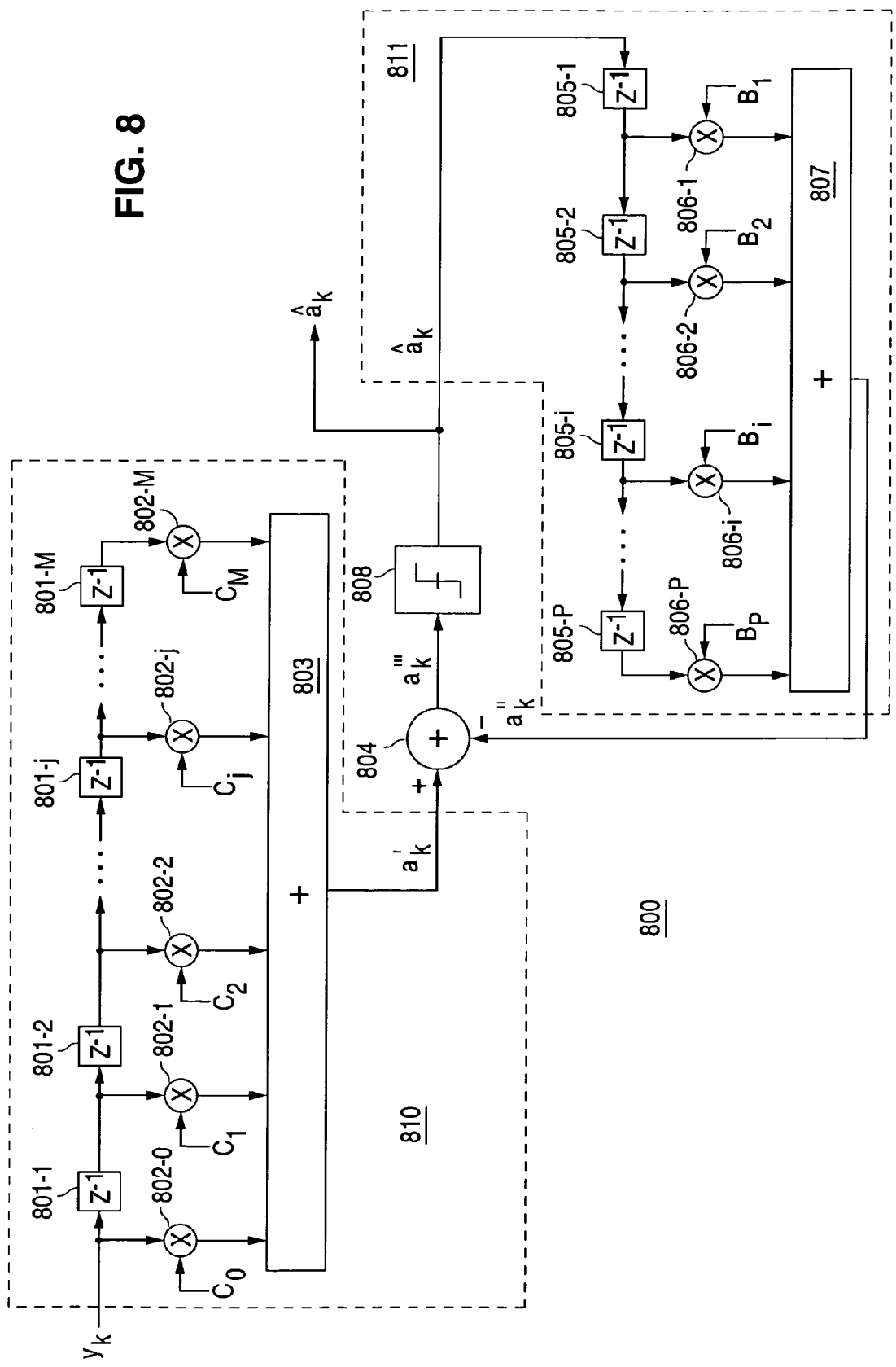
FIG. 8 shows a block diagram of a decision feedback equalizer.

FIG. 8 shows a decision feedback equalizer 800. Decision feedback equalizer 800 includes a feedforward section 810, a feedback section 811 and an adder 804. Feedforward section 810 includes delays 801-1 through 801-M coupled in series, multipliers 802-1 through 802-M coupled to receive the output signals from delays 801-1 through 801-M, respectively, a multiplier 802-0 coupled to receive the input sample to decision feedback equalizer 800, and an adder 803 coupled to receive the output signals from each of multipliers 802-0 through 802-M. The outputs signal from each of multipliers 802-0 through 802-M is the input signal to that multiplier multiplied by the corresponding one of feedforward multiplier coefficients $C_0$ through $C_M$. Feedforward multiplier coefficients $C_0$ through $C_M$ can be adaptively chosen in order to optimize the performance of the equalizer. In FIG. 5B, for example, coefficient update 506-$j$ adaptively chooses equalizer coefficients to optimize the performance of receiver 501-$j$.

Adder 803 (FIG. 8) sums the output signals from multipliers 802-0 through 802-M. Feedforward section 810, therefore, executes the transfer function $$T_{FF} = C_0 + C_1 Z^{-1} + \ldots + C_j Z^{-j} + \ldots + C_M Z^{-M}. \tag{8}$$

The output signal $a'_k$ from feedforward section 810, therefore, is given by $$a'_k = C_0 y_k + C_1 y_{k-1} + \ldots + C_j y_{k-j} + \ldots + C_M y_{k-M}, \tag{9}$$

where $y_{k-j}$ is the input sample to equalizer 800 during the (k-j)th time period. Again, the wire designation has been neglected for simplicity and it is understood that each of receivers 501-1 through 501-N (FIG. 5A) includes an equalizer 505-1 through 505-N, respectively, any of which can be a decision feedback equalizer 800 (FIG. 8).

One embodiment of feedback section 811 includes delays 805-1 through 805-P coupled in series. Multipliers 806-1 through 806-P are coupled to receive the corresponding output signals from delays 805-1 through 805-P, respectively. Multipliers 806-1 through 806-P respectively multiply their input signals by the corresponding feedback multiplier coefficients $B_1$ through $B_P$, respectively. Feedback coefficients $B_1$ through $B_P$ also can be adaptively chosen. Adder 807 sums the output signals from multipliers 806-1 through 806-P. Feedback section 811, therefore, executes the transfer function $$T_{FB} = B_1 Z^{-1} + B_2 Z^{-2} + \ldots + B_P Z^{-P}. \tag{10}$$

The input signal to feedback section 811 is symbol $\hat{a}_k$. Consequently, the output signal $a''_k$ from feedback section 811 is given by $$a''_k = B_1 \hat{a}_k\text{-}1 + B_2 \hat{a}_k\text{-}2 + \ldots + B_N \hat{a}_{k-P}. \tag{11}$$

A second embodiment of feedback section 811, which is later discussed in this disclosure, is shown as feedback section 1905 in FIG. 19 and includes look-up table 1906.

The output signal $a''_k$ from feedback section 811 is subtracted from the output signal $a'_k$ from feedforward section 810 in adder 804. The input signal $a'''_k$ to slicer 808, then, is given by $$a'''_k = a'_k - a''_k. \tag{12}$$

Slicer 808 outputs the symbol $\hat{a}_k$ that is closest to the input signal $a'''_k$.

A decision feedback equalizer operates on the principle that, if the past transmitted data is correctly detected, the ISI effects of these past data symbols can then be canceled from the currently received sample. As such, feedforward section 810 often contains no multipliers (i.e., $C_0=1$ and all other coefficients are 0) and output sample $a'_k$ equals input sample $y_k$.

Past detected data samples contain no noise and therefore decision feedback equalizers do not suffer from noise enhancement. However, decision feedback equalizers do suffer from the effects of error propagation. If slicer 808 erroneously determines a previous symbol, the error will be propagated into subsequent decisions.

Figure 9:
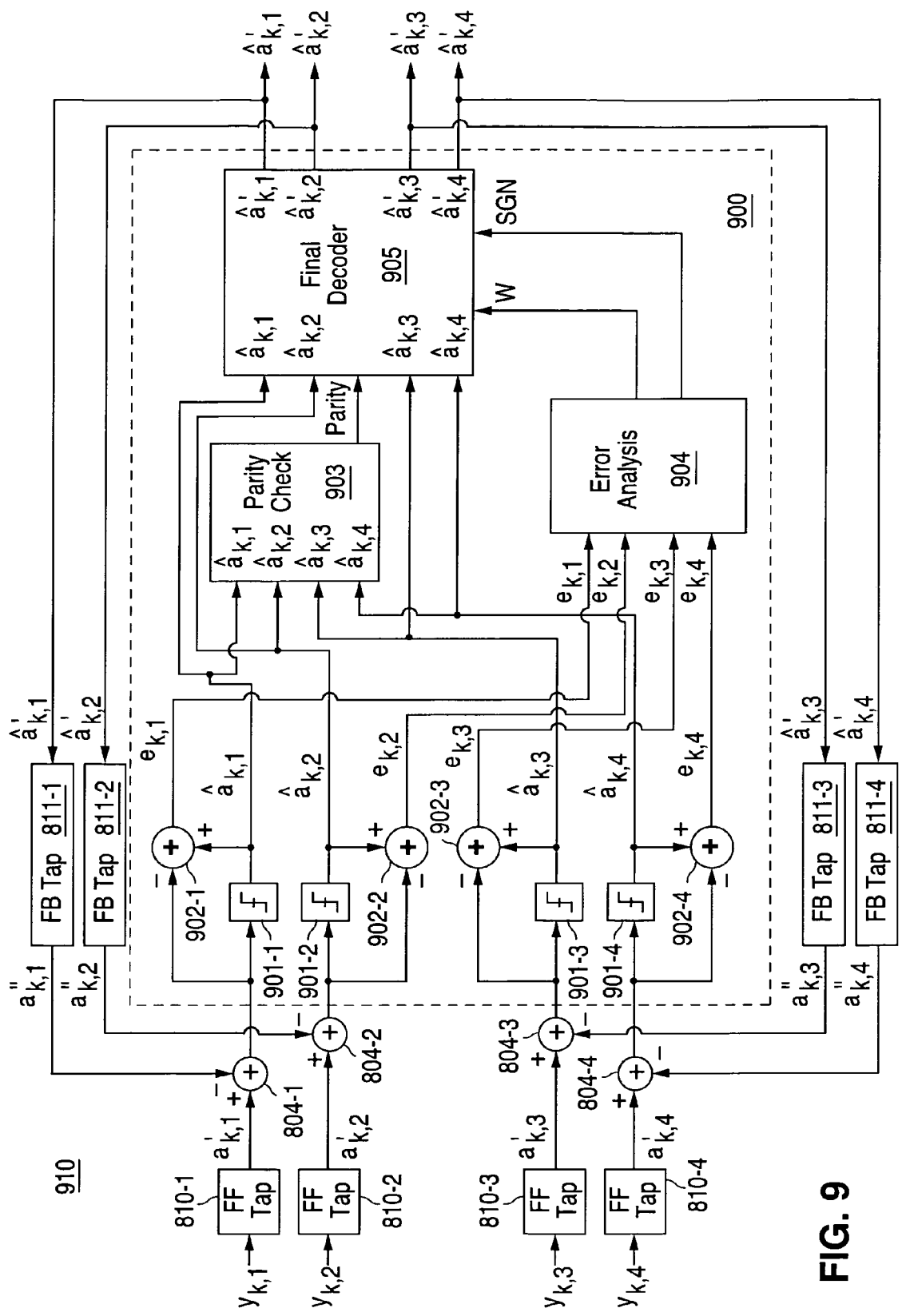
FIG. 9 shows a block diagram of the equalizer and decoder portions of a 4-D receiver system that includes decision feedback equalization.

FIG. 9 shows the equalization and decoder sections (see, for example, equalizers 505-1 through 505-N and decoder 507 of FIG. 5A for the case in which N is 4) of a 4-D receiver 910. The equalization is accomplished using four decision feedback equalizers, one for each of the four input channels shown. Again, one skilled in the art will recognize that a receiver can have any number of input channels and that a 4-D receiver is shown here for example only. In FIG. 9, receiver 910 includes 4-D decoder 900. Although decoder 900 is shown as a parity code decoder, it is understood that decoder 900 can be any 4-D decoder. One skilled in the art will recognize that 4-D decoder 900 must correct symbols within a single clock cycle so that the results can be fed back through feedback sections (or taps) 811-1 through 811-4 to correct symbols $a'_{k,1}$ through $a'_{k,4}$, respectively.

The equalization for channel 104-1, for example, is accomplished by feedforward section (or tap) 810-1, feedback section 811-1, and adder 804-1. Similarly, channels 104-2 through 104-4, each includes the corresponding ones of feedforward sections (or taps) 810-2 through 810-4, respectively, feedback sections 811-2 through 811-4, respectively, and adders 804-2 through 804-4, respectively.

Samples $y_{k,1}$ through $y_{k,4}$ originate from receiver input signals received from channels 104-1 through 104-4, respectively. Samples $y_{k,1}$ through $y_{k,4}$ are received into feedforward taps 810-1 through 810-4, respectively. The symbol outputs $â'_{k,1}$ through $â'_{k,4}$ from decoder 900, corresponding to a single 4-D symbol, are input to feedback taps 811-1 through 811-4, respectively. As was discussed with relation to FIG. 8, the output signals $a''_{k,1}$ through $a''_{k,4}$ from feedback sections 811-1 through 811-4 are respectively subtracted from the output signals $a'_{k,1}$ through $a'_{k,4}$ from feedforward sections 810-1 through 810-4, respectively, in adders 804-1 through 804-4, respectively. The output signals $a'''_{k,1}$ through $a'''_{k,4}$ from adders 804-1 through 804-4, respectively, are inputted to decoder 900.

In an embodiment where decoder 900 is a 4-D parity code decoder, the input signals $a'''_{k,1}$ through $a'''_{k,4}$ to decoder 900 are received by slicers 901-1 through 901-4, respectively. Slicers 901-1 through 901-4 respectively decide on output symbols $â_{k,1}$ through $â_{k,4}$ based on their corresponding input signals $a'''_{k,1}$ through $a'''_{k,4}$, respectively. The output symbols $â_{k,1}$ through $â_{k,4}$ from slicers 901-1 through 901-4 are inputted to parity check 903 and final decoder 905.

Parity check 903 sums the 1-D symbols $â_{k,1}$ through $â_{k,4}$ and determines whether the 4-D symbol is of even parity or odd parity. In parity coding using PAM-5 symbols, the 4-D symbol is chosen from an even subset and therefore each 4-D symbol includes an even number of 1-D PAM-5 symbols from family X (odd parity) and an even number from family Y (even parity). Therefore, the sum of the 1-D PAM-5 symbols is even. If the parity of the 4-D symbol is even, final decoder 905 outputs the symbols $â_{k,1}$ through $â_{k,4}$ as output symbols $â^1_{k,1}$ through $â^1_{k,4}$, respectively.

Error signals $e_{k,1}$ through $e_{k,4}$ are calculated in adders 902-1 through 902-4, respectively, by taking the differences between the output symbols $â_{k,1}$ through $â_{k,4}$ of slicers 901-1 through 901-4, respectively, and the corresponding input signals $a'''_{k,1}$ through $a'''_{k,4}$, respectively, for each of the transport channels:

$$e_{k,i} = a'''_{k,i} - â_{k,i},\ i=1, 2, 3,\ \text{or}\ 4. \tag{13}$$

The error signals $e_{k,1}$ through $e_{k,4}$ at slicers 901-1 through 901-4, respectively, are input to error analysis 904. Error analysis 904 determines which of the symbols $â_{k,1}$ through $â_{k,4}$ is associated with the largest error signal $e_{k,1}$ through $e_{k,4}$, respectively, and the sign SGN of the largest error. Error analysis 904 outputs an identifier W of the symbol having the largest absolute error and the sign SGN of that error to final decoder 905. If the parity signal indicates odd parity, the erroneous symbol is most likely to be the one with the largest error, indicated by identifier W. Final decoder 905, then, adjusts the symbol having the largest error up or down the symbol alphabet by one symbol depending on the sign SGN (in this example, up if the sign is positive and down if the sign is negative) and outputs the resulting 4-D output symbol defined by $â_{k,1}$ through $â^1_{k,4}$.

The combination of N-D trellis code encoding with a DFE architecture requires a DFE on all four wires for each state within the trellis (see, e.g., FIG. 3). The DFE output at a particular state is used for parallel branch decisions and branch metric computation for the branches leaving that state. The equalization in this situation uses a process called "per survivor processing", described more fully in Riccardo Raheli, Andreas Polydoros, Chin-Kai Tzou, "Per-Survivor Processing: A General Approach to MLSE in Uncertain Environments," IEEE Trans. Commun., Vol. 43, No. 2/3/4, pp. 354-364, February/March/April 1995, incorporated by reference in its entirety, to determine the feedback symbols.

The multiple decision feedback equalizers in the trellis decoder help to minimize the effects of error propagation. However, a DFE architecture has the disadvantage that it does not utilize the sample power contained in the intersymbol interference caused by the dispersion in the channel. More particularly, information about a 1-D symbol being transmitted during a time period k is contained in future received 1-D symbols from that channel and DFE does not utilize this signal power in determining the currently received symbol.

A third type of equalization, sequence detection, does not suffer the performance degradation of either a linear equalizer or a decision feedback equalizer. However, a typical sequence detector produces hard outputs that can severely limit the performance of an error correction code. According to the present invention, a soft-output sequence detector is provided.

Figure 10:
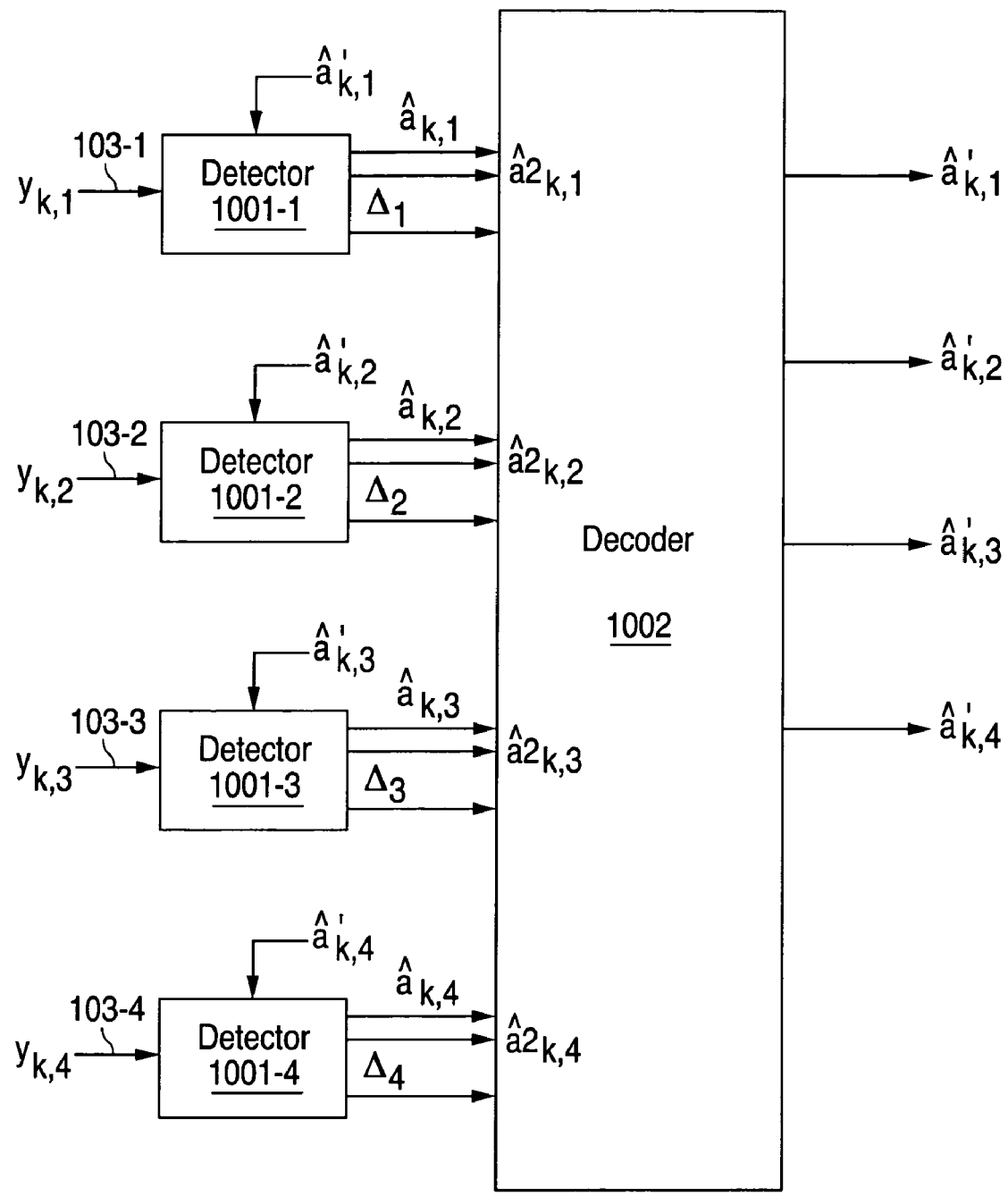
FIG. 10 shows a block diagram of a 4-D receiver system that includes sequence detection equalizers.

As an example, FIG. 10 shows a portion of a 4-D receiver utilizing sequence detection according to the present invention. The receiver shown in FIG. 10 includes sequence detectors 1001-1 through 1001-4, one for each of the four transmission channels corresponding to wires 103-1 through 103-4. One skilled in the art will recognize that a receiver can include any number N of transmission channels, each of the transmission channels providing signals to one of N detectors. Some or all of the N detectors can be sequence detectors.

The output samples $â_{k,1}$ through $â_{k,4}$ from sequence detectors 1001-1 through 1001-4, respectively, along with the second best output samples $â2_{k,1}$ through $â2_{k,4}$, respectively and the errors $\Delta_1$ through $\Delta_4$, respectively, are input to decoder 1002. Decoder 1002 decides on the receiver output samples $â'_{k,1}$ through $â'_{k,4}$ based on, for example, the parity coding scheme or the N-D lattice coding scheme. One skilled in the art will recognize that the decision of decoder 1002 can be based on any coding scheme that can correct errors in one clock cycle. Feedback is provided to sequence detectors 1001-1 through 1001-4 so that future sequences are decided using the results of the N-D decisions.

Figures 11A, 11B:
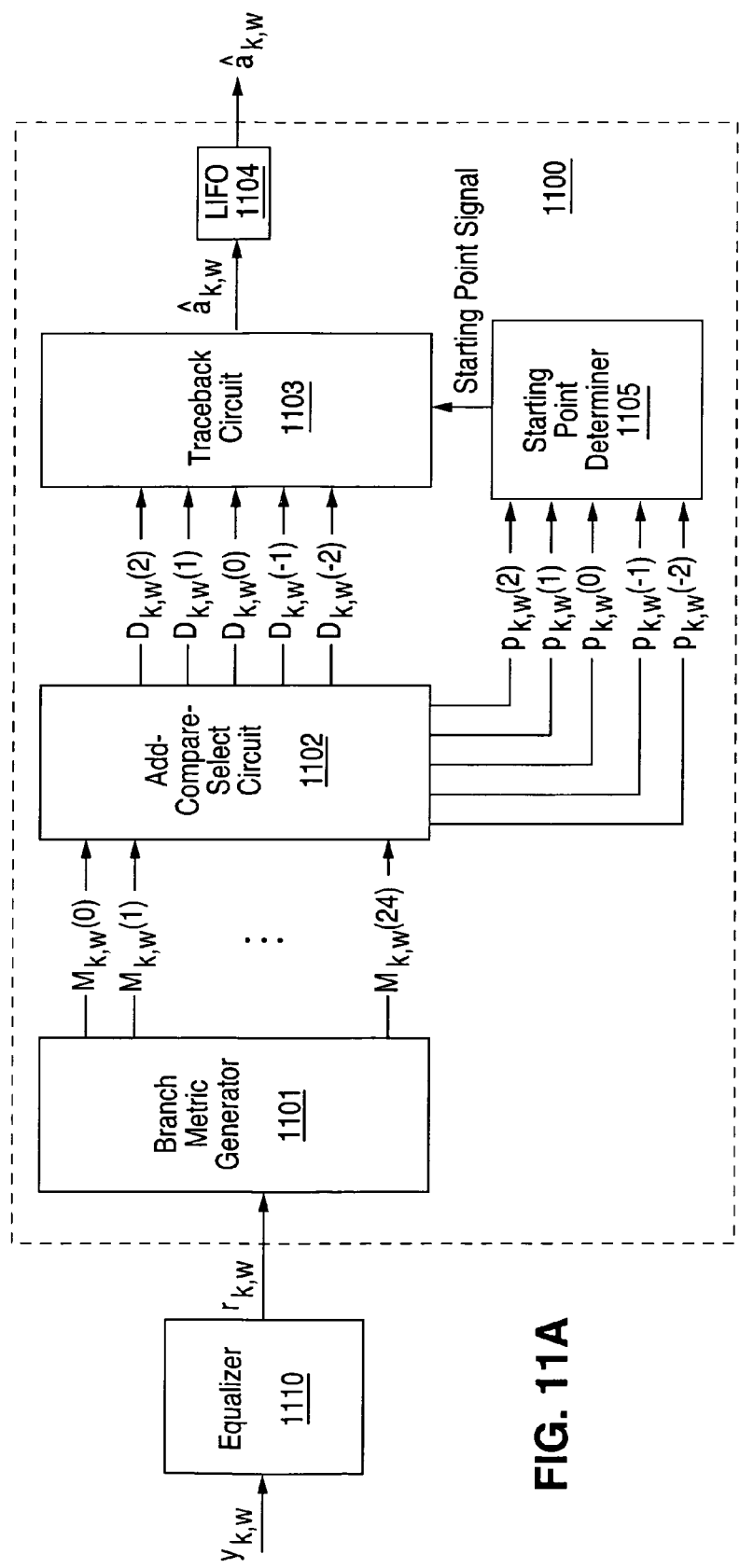
FIG. 11A shows a block diagram of a sequence detector.
FIG. 11B shows a block diagram of an embodiment of an equalizer system.

FIG. 11A shows a block diagram of a sequence detector 1100 for the PAM-5 symbol alphabet $\{A\} = \{+2, +1, 0, -1, -2\}$ where the intersymbol interference includes the effects of only one other symbol, i.e., the ISI length $\delta$ is one (1). In general, sequence detector 1100 can utilize any alphabet (A>2) and any number of ISI symbols ($\delta$>1). Detector 1100 includes a branch metric generator 1101, an add-compare-select (ACS) unit 1102, traceback circuitry 1103, a last-in-first-out (LIFO) buffer 1104, and a starting point determiner 1105. Sequence detectors are discussed in U.S. patent application Ser. No. 08/974,459, cited above.

The ISI addressed by the embodiment of detector 1100 shown in FIG. 11A is caused by just one previously transmitted symbol. Thus, the input sample $r_{k,w}$ to sequence detector 1100 is given by $$r_{k,w} = a_{k,w} + \alpha_{w,1} a_{k-1,w} - h_{k,w}, \tag{14}$$

where $\alpha_{w,1}$ is the equalizer ISI coefficient, $h_{k,w}$ is the noise component of the output signal from the linear filter over a wire w and $a_{k,w}$ is the transmitted symbol over wire w received in time period k. Sequence detector 1100 estimates the transmitted data sequence $\{a_{k,w}\}$ from the sequence of received samples $\{r_{k,w}\}$.

The state $S_{k,w}$, generally simply "S", of detector 1100 is defined as the past data symbol estimates. In general, a system with a symbol alphabet having A symbols and which suffers intersymbol interference from δ previous symbols has $A^\delta$ possible states $\underline{S}$. Each state $\underline{S}$ corresponds to a possible transition path through the δ previous symbols. For example, a system using a symbol alphabet with two symbols, $\{A\}=\{+1, -1\}$, and subjected to ISI from two past symbols, δ=2, has four possible sequence states $\underline{S}$ of the system symbol +1 at time k−2 and symbol +1 at time k−1; symbol +1 at time k−2 and symbol −1 at time k−1; symbol −1 at time k−2 and symbol +1 at time k−1; and symbol −1 at time k−2 and symbol −1 at time k−1. Sequence detector 1100 for the exemplary embodiment shown in FIG. 11A, a PAM-5 symbol alphabet with ISI resulting from one symbol, has five states $\underline{S}$—+2, +1, 0, −1, and −2—corresponding to the five symbols in the PAM-5 alphabet $\{A\}$.

Figure 12:
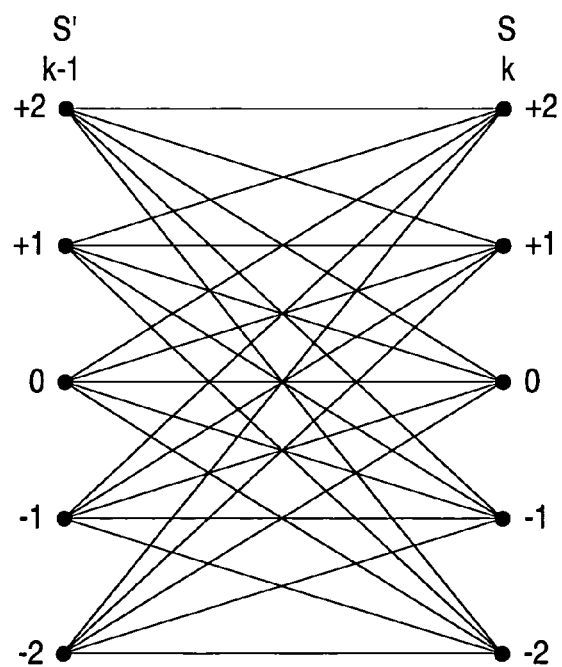
FIG. 12 shows an example of a trellis diagram for state transitions between PAM-5 symbols.

A trellis diagram depicting a state transition from time k−1 to time k for sequence detector 1100 is shown in FIG. 12. A trellis diagram provides a graphical mechanism for predicting what the signal output would be for the channel in transitions from one state $\underline{S}'$ at time k−1 to another state $\underline{S}$ at time k. As an example, from Equation 14 above, and neglecting noise, a transition from state +2 at time k−1 to a state +1 at time k results in a signal input to sequence detector 1100 of $1+2\alpha_{w,1}$.

p In sequence detector 1100 shown in FIG. 11A, branch metric generator 1101 generates distance, or branch, metrics $M_{k,w}(S' \to S)$ corresponding to the branches illustrated in the trellis diagram of FIG. 12. In so doing, branch metric generator 1101 operates generally in accordance with the Viterbi algorithm. The distance metrics $M_{k,w}(S' \to S)$ represent the difference between the input signal $r_{k,w}$ to branch metric generator 1101 and the calculated signal that is expected to be observed in each of the allowed transitions of a trellis diagram. In general, if there are $A^\delta$ states of sequence detector 1100, there are $A^{\delta+1}$ branch metrics $M_{k,w}(S' \to S)$ to calculate. In some embodiments, however, not all branches are allowed and therefore the number of branch metrics $M_{k,w}(S' \to S)$ is reduced.

For PAM-5 signaling subjected to one ISI symbol, there are twenty-five distance metrics $M_{k,w}(S' \to S)$. The twenty-five distance metrics $M_{k,w}(S' \to S)$ generated by branch metric generator 1101 for the case where ISI is the result of one past symbol and neglecting random noise (i.e., A=5, δ=1 and $f_w(z)=1+\alpha_{w,1}z^{-1}$) are given by:

$$M_{k,w}(0)=[r_{k,w}-(-2-2\alpha_{w,1})]^2; M_{k,w}(13)=[r_{k,w}-(\alpha_{w,1})]^2;$$

$$M_{k,w}(1)=[r_{k,w}-(-2-\alpha_{w,1})]^2; M_{k,w}(14)=[r_{k,w}-(2\alpha_{w,1})]^2;$$

$$M_{k,w}(2)=[r_{k,w}-(-2)]^2; M_{k,w}(15)=[r_{k,w}-(1-2\alpha_{w,1})]^2;$$

$$M_{k,w}(3)=[r_{k,w}-(-2+\alpha_{w,1})]^2; M_{k,w}(16)=]r_{k,w}-(1-\alpha_{w,1})]^2;$$

$$M_{k,w}(4)=[r_{k,w}-(-2+2\alpha_{w,1})]\text{hu }2; M_{k,w}(17)=[r_{k,w}-1]^2;$$

$$M_{k,w}(5)=[r_{k,w}-(-1-2\alpha_{w,1})]^2; M_{k,w}(18)=[r_{k,w}-(1+\alpha_{w,1})]^2;$$

$$M_{k,w}(6)=[r_{k,w}-(-1-\alpha_{w,1})]^2; M_{k,w}(19)=[r_{k,w}-(1+2\alpha_{w,1})]^2;$$

$$M_{k,w}(7)=[r_{k,w}-(-1)]^2; M_{k,w}(20)=[r_{k,w}-(2-2\alpha_{w,1})]^2;$$

$$M_{k,w}(8)=[r_{k,w}-(-1+\alpha_{w,1})]^2; M_{k,w}(21)=[r_{k,w}-92-\alpha_{w,1})]$$

$$M_{k,w}(9)=[r_{k,w}-(-1+2\alpha_{w,1})]^2; M_{k,w}(22)=[r_{k,w}-2]^2;$$

$$M_{k,w}(10)=[r_{k,w}-(-2\alpha_{w,1})]^2; M_{k,w}(23)=[r_{k,w}-(2+\alpha_{w,1})]$$

$$M_{k,w}(11)=[r_{k,w}-(-\alpha_{w,1})]^2; M_{k,w}(24)=)[r_{k,w}-(2+2\alpha_{w,1})]$$

$$M_{k,w}(12)=[r_{k,w}]^2. \tag{15}$$

Each parenthetical number after "$M_{k,w}$" is a shortened notation for indicating a transition from a state S' at time k−1 to a state S at time k.

Other metrics $M_{k,w}(S' \to S)$ which each represent the difference between the actual input symbol $r_{k,w}$ and each predicted input symbol, assuming each of the possible state transitions, may be used as distance metrics. In general, there is a distance metric $M_{k,w}(S' \to S)$ for every transition from any state S' at time k−1 to state S at time k, $A^{\delta+1}$ distance metrics $M_{k,w}(S' \to S)$ for a metrics system with A symbols and δ interfering symbols if all transitions are allowed. PAM-5 symboling is shown here only as an example and embodiments of detector 1100 can utilize other symbol alphabets and more ISI symbols.

Add-compare-select circuit 1102 in FIG. 11A updates a state (or transition) metric $p_{k,w}(S)$ for each possible state $\underline{S}$ of the system at each time step k. State metrics $p_{k,w}(S)$ are denoted by $p_{k,w}(+2), p_{k,w}(+1), p_{k,w}(0), p_{k,w}(-1)$, and $p_{k,w}(-2)$ in the PAM-5 example. For the PAM-5 symbol alphabet, the state metrics $p_{k,w}(S)$ are given by:

$$p_{k,w}(i)=\min_{j=\{-2, -1, 0, 1, 2\}}\{p_{k-1,w}(j)+M_{k,w}(5[i+2]+[j+2])\}, \tag{16}$$

where i=$\{-2, -1, 0, 1, 2\}$ for each possible state S and "min" means minimum.

In general, the state metrics $p_{k,w}(S)$ represents the accumulated distance metrics of past states along transition paths that minimize the accumulated distance metric. Therefore, the state (or transition) metric $p_{k,w}(S)$ for state S at time period k is the accumulated distance metric for previous states along a transition path which ends at state S at time period k, state S being one of the possible states of the system. At time k−1, the state of the system may be at any state S' in the group of possible states of the system. Therefore, state metric $p_{k,w}(S)$ is the minimum one of the sum of $p_{k-1,w}(S')$ and the distance metric $M_{k,w}(S' \to S)$ for transition from state S' to state S. A mathematical proof that this technique results in the least detection error is given in the Appendix of U.S. patent application Ser. No. 08/974,450, cited above.

ACS circuit 1102 generates comparison results $D_{k,w}(S)$, denoted by $D_{k,w}(+2), D_{k,w}(+1), D_{k,w}(0), D_{k,w}(-1)$ and $D_{k,w}(-2)$ for the PAM-5 example. In the example of FIG. 11A, the comparison results $D_{k,w}(+2), D_{k,w}(+1), D_{k,w}(0), D_{k,w}(-1)$ and $D_{k,w}(-2)$ are stored in a memory of traceback circuit 1103. The comparison, or ACS, results $D_{k,w}(S)$ indicate the state S' at time period k−1 which results in the state metric $p_{k,w}(S)$ for state S at time period k. In the PAM-5, δ=1 example shown in FIG. 11A, the ACS results $D_{k,w}(S)$ for each of the five states are given by $$D_{k,w}(i)=j \text{ if } p_{k,w}(i)=p_{k-1,w}(j)+M_{k,w}(5[i+2]+[j+2]). \tag{17}$$

where i=$\{-2, -1, 0, 1, 2\}$ for each possible state S and j=$\{-2, -1, 0, 1, 2\}$. In general, each comparison results $D_{k,w}(S)$ points toward the state S' at time k−1 from which results the lowest state metric $p_{k,w}(S)$ for arriving at state S at time k.

When it is time for decoding, traceback circuit 1103 traces back from a starting state, and fetches the data from memory in traceback circuit 1103.

In one example of a traceback, if the traceback depth is 2*TB, then it is expected that a traceback of TB is performed every TB/2 sample times and traceback circuit 1103 outputs TB/2 data symbols. With little loss of generality, TB can be an even integer such as 6, 8, or 16. A greater traceback depth will result in less error in determining the final sequence of symbols. Greater traceback depths, however, incur an implementation cost of requiring more memory in traceback circuit 1103.

During the traceback procedure, starting state determiner 1105 picks the starting state, which can be based on the state metrics $p_{k,w}(S)$. Traceback circuit 1103 follows the sequence back through the comparison results $D_{k,w}(S)$ stored in memory in traceback circuit 1103. The earliest TB/2 symbols, which result in the earliest states, are written into last-in-first-out buffer 1104. The new comparison results $D_{k,w}(S)$ are stored in the memory locations previously occupied by the outputted comparison results $D_{k,w}(S)$.

Traceback circuit 1103 determines the optimum sequence of symbols $\hat{a}_{k,w}$ based on the state metrics $p_{k,w}(S)$ stored in starting state determiner 1105. Starting state determiner 1105 initializes the traceback procedure by setting a starting sequence.

LIFO 1104 simply time-reverses the data $\hat{a}_{k,w}$ coming out of traceback circuit 1103 because the traceback is performed from the current time to previous times.

Sequence Detection With Pre-Equalization

When the channel ISI length δ is large, or if the transmitted symbol alphabet size A is large, the above method of full sequence estimation becomes impractical at high symbol rates. Full sequence estimations require the implementation of $A^\delta$ states in the detector. Accordingly, an equalizer 1110 is employed with sequence detector 1100 to provide pre-equalization by preprocessing the input samples $y_{k,w}$ in order to reduce the number of ISI symbols to be processed by sequence detector 1100. Equalizer 1110 can be any equalizer that reduces the number of ISI symbols. For purposes of example, assume that the channel input alphabet size A is 5, i.e., {A}={+2, +1, 0, −1, −2}, and that the reduced ISI length δ', as seen by sequence detector 1100, is 1. As before, the technique is applicable to larger alphabets and may accommodate more than one interfering symbol in the reduced length.

Repeating Equation 14, the output $r_{k,w}$ of the equalizer 1110 with A=5 and δ'=1 is given by $$r_{k,w} = a_{k,w} + \alpha_{w,1} a_{k-1,w} + h_{k,w}, \quad (18)$$

where $\alpha_{w,1}$ is again the equalized ISI coefficient and $h_{k,w}$ is again the noise component of the output of the linear equalizer 1110. The transfer function $E_w(z)$ (in z-transform notation, see A. V. OPPENHEIM AND R. W. SCHAFER, DISCRETE-TIME SIGNAL PROCESSING (1989)) for equalizer 1110 is then given by $$E_w(z) = (1 + \alpha_{w,1} z^{-1})/f_w(z). \quad (19)$$

The coefficient $\alpha_{w,1}$ is chosen to minimize the noise variance at the equalizer output. Equalizer 1110, therefore, is a reduced sequence equalizer because it reduces the ISI length from δ to δ'. The reduced ISI length δ' is 1 in this example.

In one embodiment, reduced sequence equalizer 1110 is implemented adaptively. One architecture used for adaptive implementation is shown in FIG. 11B. In this embodiment, equalizer 1110 includes a linear equalizer 1120 implementing a transfer function $C(Z) = 1/f(Z) = C_0 + C_1 Z^{-1} + \ldots + C_\delta Z^{-\delta}$, adaptively followed by a filter 1121 generally implementing the transfer functions $1 + \alpha_{w,1} Z^{-1} + \ldots + \alpha_{w,\delta} Z^{-\delta 40}$. Reduced ISI length δ' is 1 for filter 1121 in the example of FIG. 11B so that filter 1121 specifically implements the transfer function $1 + \alpha_{w,1} Z^{-1}$ in FIG. 11B. By implementing both equalizer 1120 and filter 1121 adaptively, optimal performance can be achieve for any cable length. Linear equalizer 1120 can be adaptively implemented by using the least mean squares (LMS) algorithm (see E. A. LEE AND D. G. MESSERSCHMITT, DIGITAL COMMUNICATIONS (1988)) and a finite impulse response filter as shown for equalizer 600 in FIG. 6.

The coefficients $\alpha_{w,1}$ through $\alpha_{w,\delta'}$ can be chosen adaptively in sequence detector 1100 by observing the frequency response of linear equalizer 1120. From linear equalizer 1120, the channel frequency response is deduced and coefficients $\alpha_{w,1}$ through $\alpha_{w,\delta'}$ can be selected from a look-up table. In one embodiment with reduced ISI length δ' equal to 1, two possible values (0 and /1;2) of coefficient $\alpha_{w,1}$ are used. One of the two possible values is chosen by observing the two largest equalizer coefficients $C_0$ and $C_1$ of linear equalizer 1120. For example, in one embodiment, coefficient $\alpha_{w,1}$ is 0.5 if $C_1/C_0$ is less than 0.5. Otherwise, coefficient $\alpha_{w,1}$ is 0.

The benefits of combining linear equalization with sequence detection include (a) reduced complexity in the sequence detector, especially for large ISI lengths, and (b) reduced noise enhancement in the linear equalization.

In the example described above in connection with FIGS. 11A and 11B with reduced ISI length δ'=1, the number of states in sequence estimator 1100 is reduced from $5^\delta$ to 5. The reduced state sequence estimator can be implemented using the Viterbi algorithm.

Sequence Detection with Pre-Equalization and Decision Feedback

Figure 13:
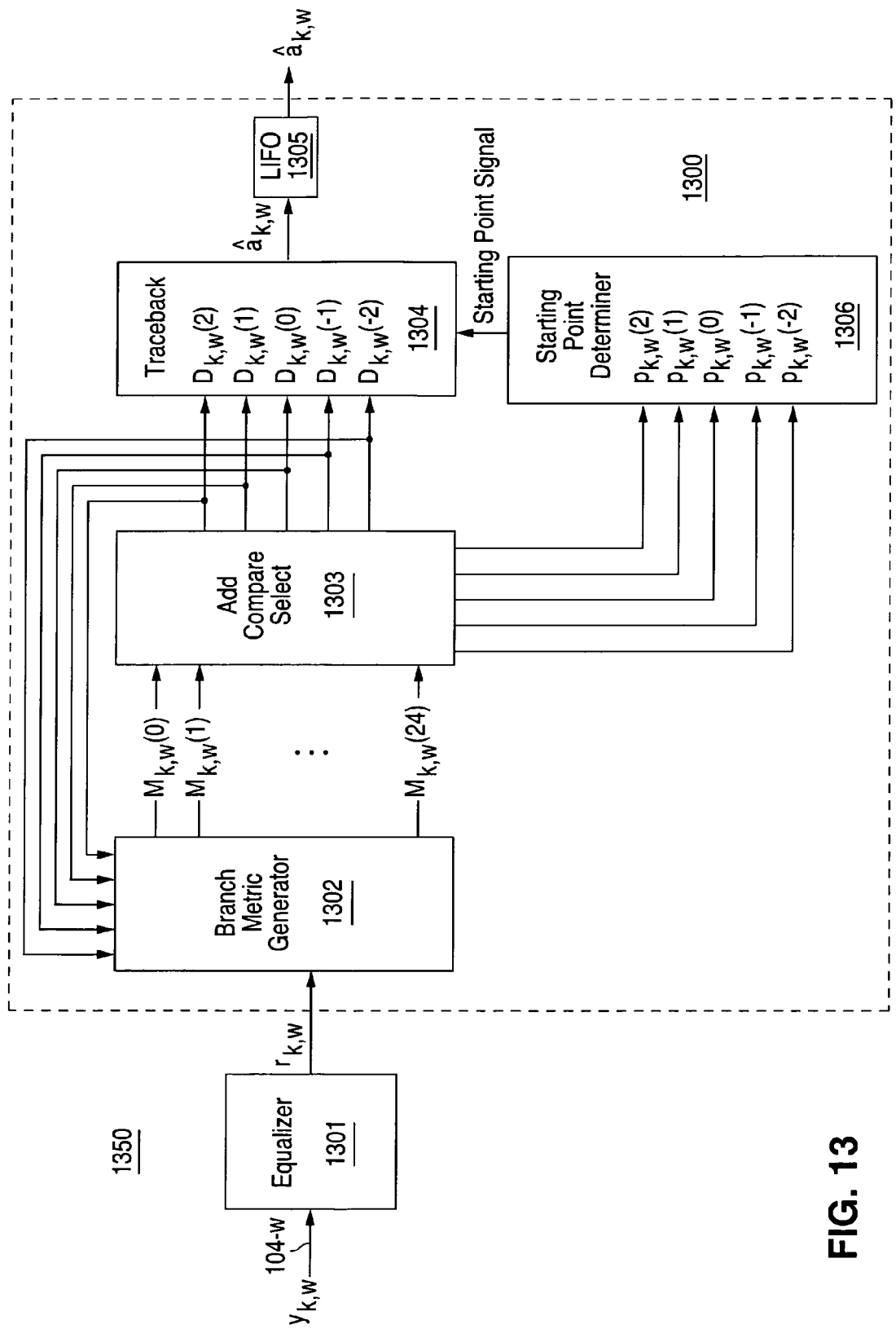
FIG. 13 shows a block diagram of an embodiment of a sequence detector equalizer with decision feedback according to the present invention.

FIG. 13 shows a receiver 1350 that includes an embodiment of a sequence detector 1300 having decision feedback. In this embodiment, equalizer 1301, which as before can be any equalizer structure, pre-equalizes transmission channel 104-w to a pre-determined ISI polynomial $G_w(z)$ of length η≦δ, where δ is the ISI length of the frequency response $f_w(z)$ of transmission channel 104-w. In one example, η is 2 and the ISI polynomial $G_w(z)$ is given by $$G_w(z) = 1 + \alpha_{w,1} z^{-1} + \alpha_{w,2} z^{-2}. \quad (20)$$

The transfer function $E_w(z)$ of equalizer 1301 is given by $$E_w(z) = G_w(z)/f_w(z). \quad (21)$$

Sequence detector 1300 includes branch metric generator 1302, add compare select (unit) 1303, traceback (circuit) 1304, LIFO 1305 and starting point determiner 1306. In general, the detection technique implemented in sequence estimator 1300 may be used for any combination of transmission-channel ISI length δ and pre-equalized ISI polynomial length η such that η≦δ. Although the technique may be implemented with any sized alphabet, the example shown in FIG. 13 is for the PAM-5 alphabet (A=5). The coefficients $\alpha_{w,1}$ and $\alpha_{w,2}$ can be chosen adaptively to optimize performance of the receiver 1350.

To perform the sequence estimation using the Viterbi algorithm, as outlined above, sequence detector 1300 is still implemented with twenty-five states (if the data symbols are PAM-5 values). The branch metric computations from a trellis diagram now account for the intersymbol interference due to the symbols transmitted two sample times before as well as the symbol transmitted during the last period. In one embodiment, the branch metrics $M_{k,w}(S' \to S)$ computed by branch metric generator 1302 with decision feedback are given by:

$M_{k,w}(0)\_=\_[r_{k,w}-\alpha_{w,2}D_{k-1}(-2)-(-2-2\alpha_{w,1})]^2;$ $M_{k,w}(1)\_=\_[r_{k,w}-\alpha_{w,2}D_{k-1}(-1)-(-2-\alpha_{w,1})]^2;$ $M_{k,w}(2)\_=\_[r_{k,w}-\alpha_{w,2}D_{k-1}(0)-(-2)]^2;$ $M_{k,w}(3)\_=\_[r_{k,w}-\alpha_{w,2}D_{k-1}(1)-(-2+2\alpha_{w,1})]^2;$ $M_{k,w}(4)\_=\_[r_{k,w}-\alpha_{w,2}D_{k-1}(2)-(-1-2\alpha_{w,1})]^2;$ $M_{k,w}(5)\_=\_[r_{k,w}-\alpha_{w,2}D_{k-1}(-2)-(-1-2\alpha_{w,1})]^2;$ $M_{k,w}(6)\_=\_[r_{k,w}-\alpha_{w,2}D_{k-1}(-1)-(-1-\alpha_{w,1})]^2;$ $M_{k,w}(7)\_=\_[r_{k,w}-\alpha_{w,2}D_{k-1}(0)-(-1)]^2;$ $M_{k,w}(8)\_=\_[r_{k,w}-\alpha_{w,2}D_{k-1}(1)-(-1+2\alpha_{w,1})]^2;$ $M_{k,w}(9)\_=\_[r_{k,w}-\alpha_{w,2}D_{k-1}(2)-(-1+2\alpha_{w,1})]^2;$ $M_{k,w}(10)\_=\_]r_{k,w}-\alpha_{w,2}D_{k-1}(-2)-(-2\alpha_{w,1})]^2;$ $M_{k,w}(11)\_=\_]r_{k,w}-\alpha_{w,2}D_{k-1}(-1)-(\alpha_{w,1})[^2;$ $M_{k,w}(12)\_=\_]r_{k,w}-\alpha_{w,2}D_{k-1}(0)]^2;$ $M_{k,w}(13)\_=\_]r_{k,w}-\alpha_{w,2}D_{k-1}(1)-\alpha_{w,1}]^2;$ $M_{k,w}(14)\_=\_]r_{k,w}-\alpha_{w,2}D_{k-1}(2)-2\alpha_{w,1}]^2;$ $M_{k,w}(15)\_=\_]r_{k,w}-\alpha_{w,2}D_{k-1}(-2)-(1-2\alpha_{w,1})]^2;$ $M_{k,w}(16)\_=\_]r_{k,w}-\alpha_{w,2}D_{k-1}(-1)-(1-\alpha_{w,1})]^2;$ $M_{k,w}(17)\_=\_]r_{k,w}-\alpha_{w,2}D_{k-1}(0)-1]^2;$ $M_{k,w}(18)\_=\_]r_{k,w}-\alpha_{w,2}D_{k-1}(1)-(1+\alpha_{w,1})]^2;$ $M_{k,w}(19)\_=\_]r_{k,w}-\alpha_{w,2}D_{k-1}(2)-(1+2\alpha_{w,1})]^2;$ $M_{k,w}(20)\_=\_]r_{k,w}-\alpha_{w,2}D_{k-1}(-2)-(2-2\alpha_{w,1})]^2;$ $M_{k,w}(21)\_=\_]r_{k,w}-\alpha_{w,2}D_{k-1}(-1)-(2-\alpha_{w,1})]^2;$ $M_{k,w}(22)\_=\_]r_{k,w}-\alpha_{w,2}D_{k-1}(0)-2]^2;$ $M_{k,w}(23)\_=\_]r_{k,w}-\alpha_{w,2}D_{k-1}(1)-(2+\alpha_{w,1})]^2;$ $$M_{k,w}(24)\_=\_]r_{k,w}-\alpha_{w,2}D_{k-1}(2)-(2+2\alpha_{w,1})]^2. \quad (22)$$

The ISI due to the transmitted symbol at time k−2 is removed from the received sample $r_{k,w}$ before the branch metric $M_{k,w}(S' \rightarrow S)$ that accounts for the ISI due to the transmitted symbol at time k−1 is computed. After this calculation, the previously described calculation is performed to remove the ISI due to the (k−1)th transmitted symbol.

Add compare select 1303 then computes the state metrics $p_{k,w}(i)$ and the comparison results $D_{k,w}(i)$ as described above in Equations 16 and 17, respectively. Traceback 1304 accepts a starting point from starting point determiner 1306, as described above for the corresponding components of sequence detector 1100 in FIG. 11A, and outputs a set of decided-on symbols $â_{k,w}$ to LIFO 1305. LIFO 1305, then, outputs the resulting symbols $â_{k,w}$ in reverse chronological order from that received.

Sequence Detection in Combination with Error Correction

Although achieving excellent noise margins, the combination of sequence detection with error correction codes is problematic. Sequence detectors usually produce hard decisions (i.e., decisions that do not contain information on reliability), which become input signals to error correcting codes. Most error correcting techniques, such as the parity coding or 4-D lattice coding proposed for Gigabit Ethernet, rely on soft decisions (i.e. decisions that contain reliability information) to achieve full performance. See, e.g., LIN AND D. J. COSTELLO, JR., ERROR CONTROL CODING: FUNDAMENTALS AND APPLICATIONS (1983). Thus, a typical sequence detector in combination with a decoder using an error correcting code does not achieve the improved SNR margins of both the sequence detector and the error correcting code unless the decoder is provided with a soft decision from the sequence detector.

Figure 14:
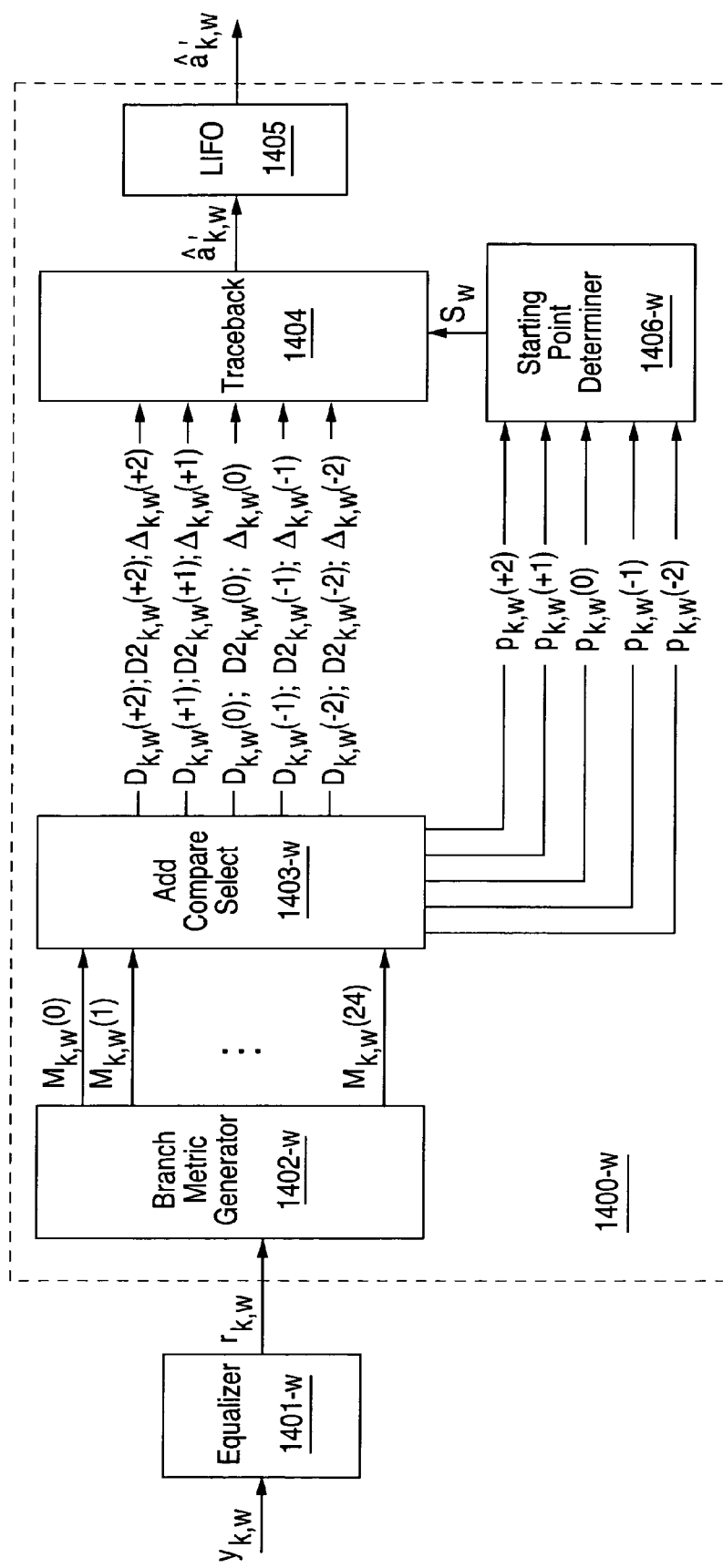
FIG. 14 shows a block diagram of an embodiment of a sequence detector equalizer having soft outputs according to the present invention.

FIG. 14 shows a sequence detector 1400-w according to the present invention. Sequence detector 1400-w is coupled to receive signal $r_{k,w}$ from wire w. Sequence detector 1400-2 includes branch metric generator 1402-2, add compare select (unit) 1403-w, and starting point determiner 1406-w. Add compare select 1402-w and starting point determiner 1406-w are each coupled to traceback circuit 1404.

Traceback 1404 is coupled to each wire w so that the traceback can be accomplished on N-D symbols rather than performing a separate traceback on N 1-D symbols, where N is the number of wires. Traceback 1404 is also coupled with LIFO 1405. LIFO 1405 outputs the final symbol stream $â'_{k,w}$} for each wire w.

A sequence detector according to the present invention can accommodate any symbol alphabet {A} and any number δ of ISI symbols. For example, sequence detector 1400-w shown in FIG. 14 is for a PAM-5 alphabet where input signals are subjected to the influence of one past ISI symbol (i.e., the ISI length δ is 1). As occurs with equalizer 1110 in FIG. 11A (see Equation 19), equalizer 1401-w executes a transfer function $E(Z)=(1+\alpha_{w,1}Z^{-1})/f_w(Z)$, and therefore sequence detector 1400-w detects a signal that includes ISI from one past symbol. Branch metric generator 1402-w therefore generates the branch metrics $M_{k,w}(S' \rightarrow S)$ as described in Equation 15.

Add compare select 1403-w computes the state metrics $p_{k,w}(i)$ for i={−2, −1, 0, 1, 2} according to Equation 16 and the ACS results $D_{k,w}(i)$ for i={−2, −1, 0, 1, 2} according to Equation 17. Additionally, ACS 1403-w computes a second best state metric $p2_{k,w}(i)$, a second ACS result $D2_{k,w}(i)$ and a difference result $\Delta_{k,w}(i)$. The second best state metric $p2_{k,w}(i)$ can be computed according to $$p2_{k,w}(i)=\text{second min}_{j=\{-2,-1,0,1,2\}}\{p_{k-1,w}(j)+M_{k,w}(5[i+2]+[j+2])\}, \quad (23)$$

where i={−2, −1, 0, 1, 2} and "min" again means minimum. The second ACS result $D2_{k,w}(i)$ can be computed according to $$D2_{k,w}(i)=j \text{ if } p2_{k,w}(i)=p_{k-1,w}(j)+M_{k,w}(5[i+2]+[j+2]), \quad (24)$$

where i={−2, −1, 0, 1, 2} and j={−2, −1, 0, 1, 2}. Finally, the difference result $\Delta_{k,w}(i)$ can be computed according to $$\Delta_{k,w}(i)=p2_{k,w}(i)-p_{k,w}(i), \quad (25)$$

where again i={−2, −1, 0, 1, 2}. Traceback 1404 receives the best ACS results $D_{k,w}(i)$, the second best ACS results $D2_{k,w}(i)$, and the difference results $\Delta_{k,w}(i)$ from each state on each wire w as well as a starting point signal $S_w$ from starting point determiner 1406-w for each wire w.

Figure 15:
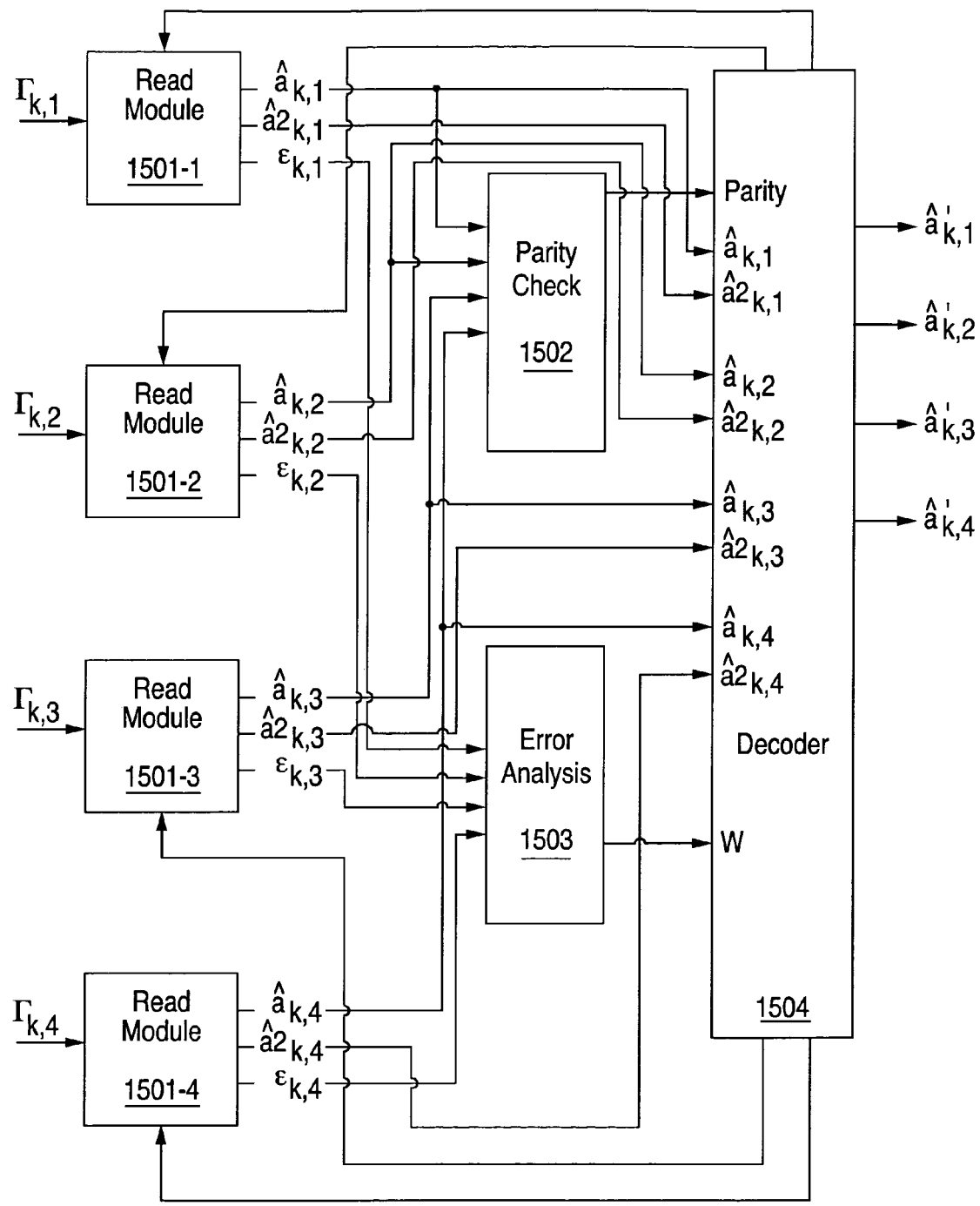
FIG. 15 shows a block diagram of an embodiment of a parity code receiver that includes soft output sequence detection equalizers according to the present invention.

FIG. 15 shows an embodiment of 4-D traceback 1404 for use with four sequence detectors 1400-1, 1400-2, 1400-3, and 1400-4 each configured as sequence detector 1400-w. For an N-wire configuration, traceback 1404 is generally coupled into N sequence detectors similar to that shown in FIG. 14, one of each wire w. In FIG. 15, traceback 1404 includes a parity code decoder 1504. Other coding schemes can be used, provided that the coding scheme can correct symbols within one clock cycle. Since the embodiment of traceback 1404 in FIG. 15 is configured for use with four sequence detectors 1400-w, decoder 1504 in FIG. 15 is shown as a four-wire parity-code decoder.

Traceback 1404 includes four read modules 1501-1 through 1501-4, one for each of the four wires. Each read module 1501-1 through 1501-4 receives parameters $\Gamma_{k,w}$ from add compare select 1403-w and starting point determiner 1406-w (FIG. 14). Parameters $\Gamma_{k,w}$ includes the ACS results $D_{k,w}(i)$, $D2_{k,w}(i)$ and $\Delta_{k,w}(i)$, where i=(−2, −1, 0, 1, 2) for PAM-5 signaling, as well as starting point $S_w$ for each wire w. As was discussed before, starting point determiner 1406-w chooses starting point $S_w$, which can be based on the state metrics $p_{k,w}(i)$, for traceback 1404.

Traceback 1404 in FIG. 15 traces back to arrive at the best sequence $\{â'_{k,w}\}$ for each wire w. For each clock cycle k, each read module 1500-1 arrives at a best symbol $â_{k,w}$, a second best symbol $â2_{k,w}$ and an associated reliability measure $\epsilon_{k,w}$ for corresponding wire w.

As described above, the 4-D parity coding scheme only transmits 4-D symbols having even parity. A single error is one 1-D symbol will cause the parity of the 4-D symbol to become odd. Similar to "4-D slicing", traceback 1404 recognizes the parity error and makes corrections to the four 1-D symbols from read modules 1501-1 through 1501-4 for clock cycle k based on the reliability of each of the 1-D symbols.

Hagenauer has shown that, within a Viterbi decoder, the reliability of decision symbol paths merging at each state grows with the difference between the state metrics between the two paths. See J. Hagenauer and P. Hocher, "A Viterbi Algorithm with Soft-Decision Outputs and its Applications," Proc. GLOBECOM '89, pages 1680-1686, Nov. 1989. Similarly to Hagenauer's Soft Output Viterbi Algorithm (SOVA), each of read modules 1501-1 through 1501-4 outputs the difference metric $\epsilon_{k,1}$ through $\epsilon_{k,4}$, respectively, i.e., the reliability measure, between the best two paths entering each state. SOVA uses difference metrics $\epsilon_{k,1}$ through $\epsilon_{k,4}$ over a range of sample times within the trellis to output soft decisions for every symbol.

However, 4-D parity traceback 1404 can recognize when a single error occurs. Therefore, only the difference metrics $\epsilon_{k,1}$ through $\epsilon_{k,4}$ at the time of the error are required to correct errors. Because the actual decoding is accomplished during traceback in each of sequence detectors 1400-1 through 1400-4 traceback 1404 recognizes an error in its channel and corrects the error in its own sequence path.

For each clock cycle k, traceback 1404 retrieves the first choice 1-D symbols $â_{k,1}$ through $â_{k,4}$, the second choice 1-D symbols $â2_{k,1}$ through $â2_{k,4}$, and the reliability measures $\epsilon_{k,1}$ through $\epsilon_{k,4}$, and determines the finally decided-on four 1-D symbols $â'_{k,1}$ through $â'_{k,4}$.

For each clock cycle k, parity check 1502 receives the first choice symbols $â_{k,1}$ through $â_{k,4}$ from read modules 1501-1 through 1501-4, respectively, determines the parity of the resulting 4-D symbol and outputs a parity signal indicating the parity of the 4-D symbol. Error analysis 1503 receives reliability measures $\epsilon_{k,1}$ through $\epsilon_{k,4}$ from read modules 1501-1 through 1501-4, respectively, determines which of the sequence detectors 1400-1 through 1400-4 has the least reliability, thereby indicating which result is most likely to be incorrect, and outputs a wire signal W indicating which of first choice 1-D symbols $â_{k,1}$ through $â_{k,4}$ is most likely to be incorrect. Decoder 1504 receives the first choice symbols $â_{k,1}$ through $â_{k,4}$, the second choice symbols $â2_{k,1}$ through $â2_{k,4}$, the parity signal from parity check 1502, and the wire signal W from error analysis 1503.

If the parity signal indicates that the parity of the first choice 4-D symbol is even, then the first choice symbols $â_{k,1}$ through $â_{k,4}$ are output as the finally decided-on symbols $â'_{k,1}$ through $â'_{k,4}$. However, an odd parity indicates an error in one of the first choice symbols $â_{k,1}$ through $â_{k,4}$. If the parity signal indicates an odd parity, the symbol indicated by the wire signal W is replaced by a corresponding one of second choice symbols $â2_{k,1}$ through $â2_{k,4}$ and the resulting 4-D symbol is output as finally decided-on symbols $â'_{k,1}$ through $â'_{k,4}$.

Additionally, decoder 1504 informs read modules 1501-1 through 1501-4 of the finally decided-on symbols $â'_{k,1}$ through $â'_{k,4}$ by indicating, for each of read modules 1501-1 through 1501-4, which of the first choice symbols $â_{k,1}$ through $â_{k,4}$ or the second choice symbols $â2_{k,1}$ through $â2_{k,4}$ was output as the finally decided-on symbols $â'_{k,1}$ through $â'_{k,4}$ for clock cycle k. Read modules 1501-1 through 1501-4 can then traceback accordingly and respectively output the first choice symbols $â_{k-1,1}$ through $â_{k-1,4}$, the second choice symbols $â2_{k-1,1}$ through $â2_{k-1,4}$, and the reliability measures $\epsilon_{k-1,1}$ through $\epsilon_{k-1,4}$ for clock cycle k−1.

In other words, read module 1501-2 outputs the best possible step back $â_{k,w}$, the second best step back $â2_{k,w}$, and the reliability measure $\epsilon_{k,w}$ for each wire w for clock cycle k. Parity check 1502 performs a parity check on the best possible step back $â_{k,w}$. Error analysis 1503 determines the wire w most likely to be incorrect. If parity passes, decoder 1504 outputs the best possible step back $â_{k,w}$ for clock cycle k. If parity fails, decoder 1504 replaces one of the best possible symbols $â_{k,w}$ with the associated second best symbol $â2_{k,w}$, based on which wire w is most likely to be incorrect, and outputs the resulting 4-D symbol. The choice of best symbol $â_{k,w}$ or second best symbol $â2_{k,w}$ for each wire w is communicated back to read module 1501-w so that read module 1501-w can use the appropriate symbol $â_{k,w}$ or $â2_{k,w}$ to step back to clock cycle k−1. The replacement choice then affects only one read module 1501-w. Therefore, the next set of symbols will be affected in one read module 1501-w only.

As shown in FIG. 14, the output symbols $â'_{k,w}$ are output to LIFO 1405, which time reverses the order of the symbol stream and outputs the resulting symbol stream $\{â'_{k,w}\}$.

One skilled in the art will recognize that in general a sequence detector according to this invention can accommodate any symbol alphabet and the effects of any number of ISI symbols. Additionally, the sequence detector may include decision feedback as shown in FIG. 13.

Reduced Complexity Sequence Detection Using State Reduction

If the alphabet size is larger or if the ISI length at the sequence detector is large, sequence detector 1400-w shown in FIG. 14 and traceback 1404 using parity coding shown in FIG. 15 become practical at high symbol rates. The number of states required in read modules 1501-1 through 1501-4 is $A^\eta$ on each wire, where A represents the number of symbols in alphabet $\{A\}$ and $\eta$ represents the ISI symbol length at the sequence detector (i.e., at the input terminal of sequence detector 1400 in FIG. 14), is high. With a PAM-5 alphabet and $\eta=2$ ISI symbols, each of read modules 1501-1 through 1501-4 requires twenty-five states in order to perform sequence detection. A decoder utilizing a large number of states is expensive, difficult to implement, and consumes a lot of power.

Figure 16:
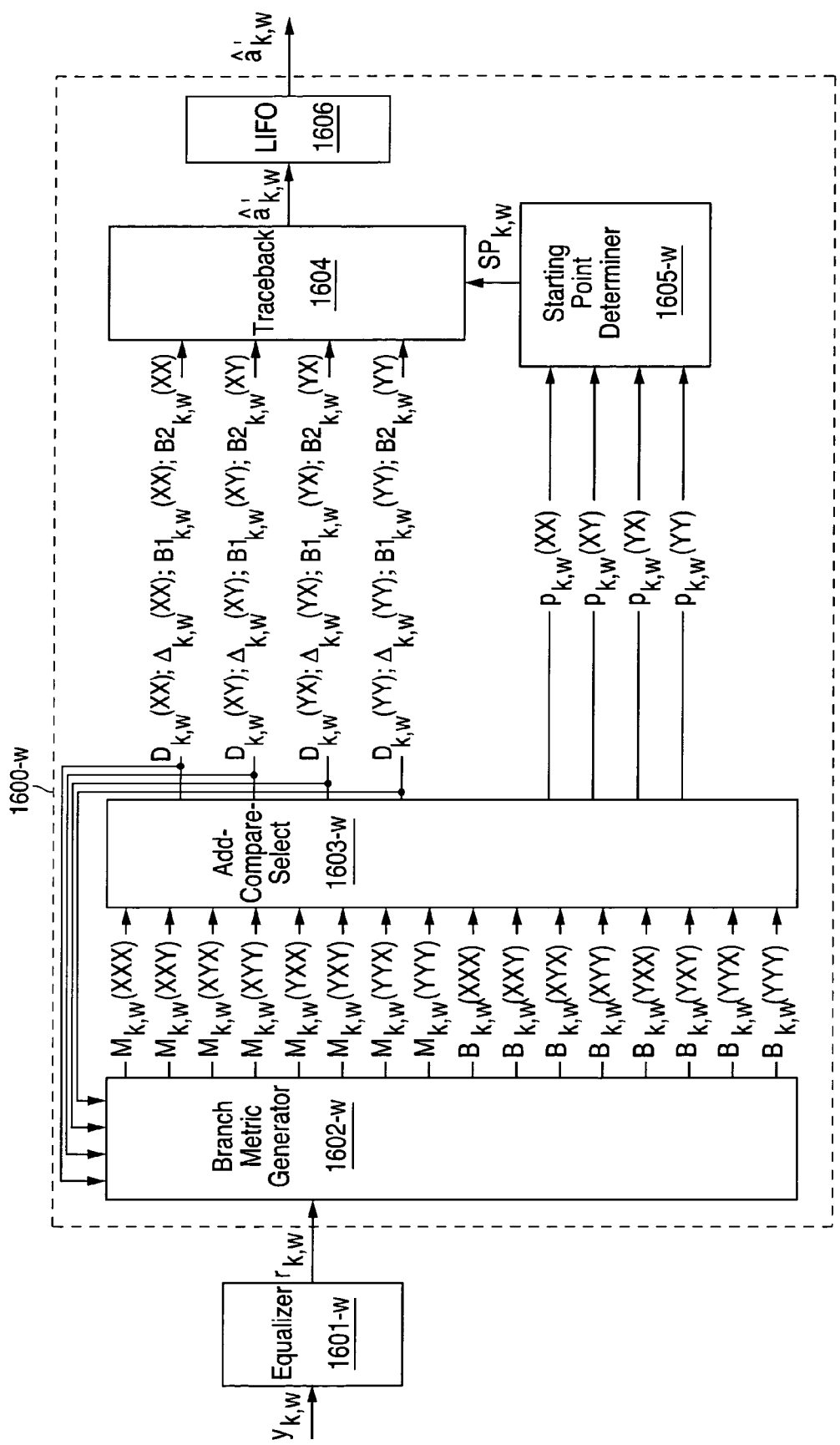
FIG. 16 shows an embodiment of a reduced complexity sequence detector having soft outputs according to the present invention.

FIG. 16 shows a sequence detector 1600-w having reduced complexity sequence detection. In particular, sequence detector 1600-w includes branch metric generator 1602-w, add-compare-select (unit) 1603-w, and starting point determiner 1605-w. Traceback circuit 1604 and LIFO 1606 are coupled into sequence detector 1600-2 as well as similar detectors coupled to the remaining N wires w. As an example, sequence detector 1600-w is shown for the PAM-5 alphabet. Embodiments of sequence detector 1600-w can utilize other symbol alphabets as well.

As mentioned above, the PAM-5 symbol alphabet can be segregated into two families, an odd family X having the PAM-5 symbols $\{-1, +1\}$ and an even family Y having the PAM-5 symbols $\{-2, 0, +2\}$. A detector state can now be defined as the previous $\eta$ families X and Y, as opposed to the previous $\eta$ PAM-5 symbols $\{-2, -1, 0, +1, +2\}$. Therefore, the number of states required for the PAM-5 symbol alphabet with $\eta=2$ ISI symbols is reduced from 25 states to 4 states on each transmission channel w=1 through L. For a four wire system (4-D decoding, for example), there are a total of sixteen states instead of one hundred states.

Reduced state detection can be accomplished when the minimum squared distance between any two parallel branches of a state transition S→S' exceeds the minimum squared distance between any two paths in the trellis where the definitions of states S and S' are reversed from that used earlier. A parallel branch refers to transitions S→S' between individual states through different symbols. For example, a state S=X can transition to a state S'=X through receipt of either a−1 symbol or a+1 symbol.

The actual minimum squared distance between sequence does not decrease and thus the performance undergoes little or no degradation from that of full state sequence detection. Gigabit Ethernet using a PAM-5 symbol set subjected to ISI from two symbols meets this criteria.

Figure 17:
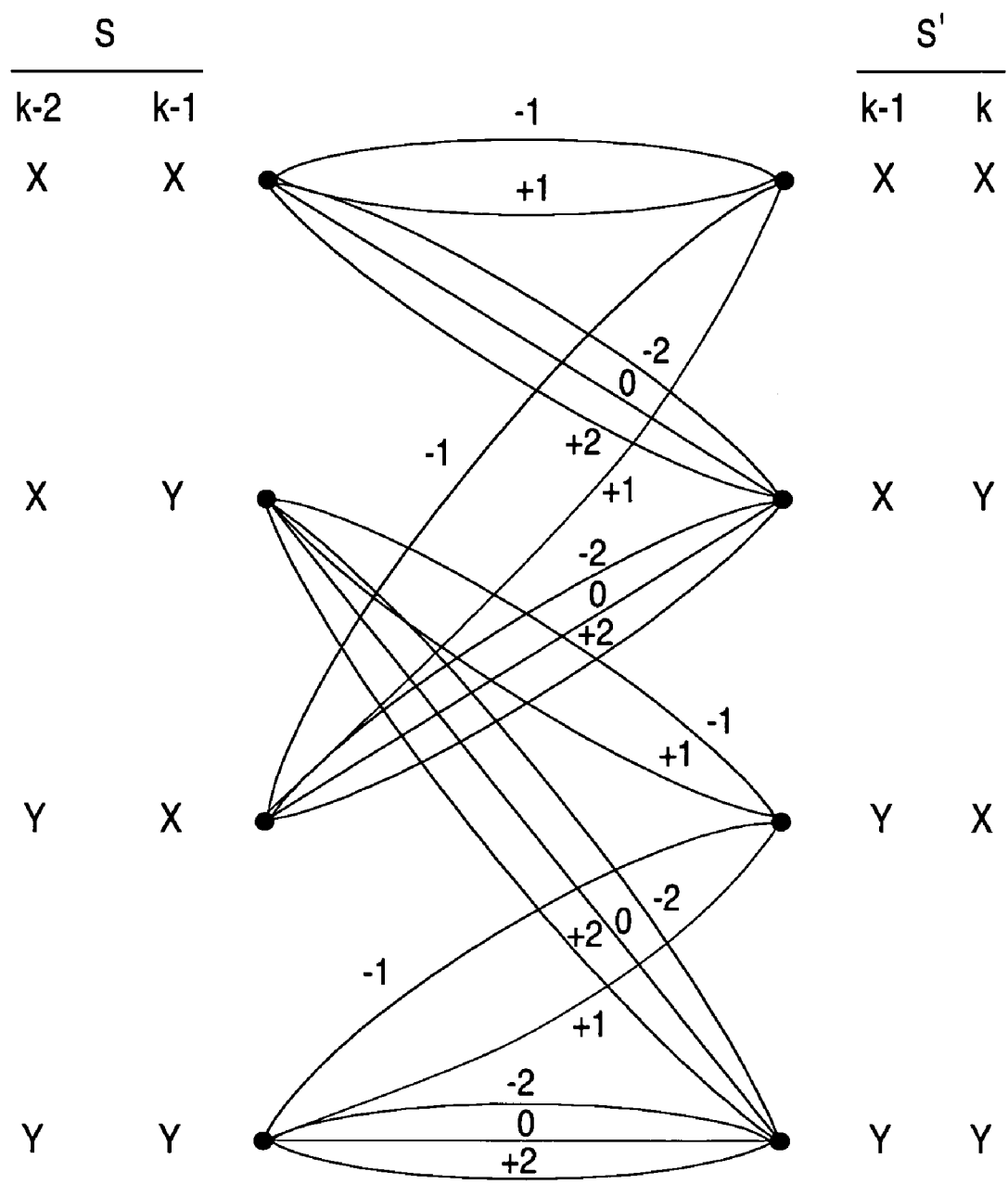
FIG. 17 shows an example of a trellis diagram illustrating state changes between reduced states of a reduced complexity sequence detector, including multiple branches between states.

FIG. 17 shows a trellis diagram displaying the reduced state transitions and all parallel PAM-5 transitions. In FIG. 17, a state is represented by two consecutive symbols reflecting an ISI length of 2. A transition from state S at time k−1 to state S' at time k has two or three parallel branches depending upon whether the new symbol entering at state S' is in family X or family Y. For example, a transition from state XX at time k−1 to state XX at state k has two branches because the incoming symbol must be either a−1 or +1 PAM-5 symbol. A transition from state XX at time k−1 to a state XY at time k, however, indicates that either a −2, 0 or +2 symbol is received and therefore that there are three branches.

In FIG. 16, equalizer 1601-w can execute the transfer function $$E(Z) = (1 + \alpha_1 Z^{-1} + \alpha_2 Z^{-2})/f(Z). \tag{26}$$

Therefore, the expected signal input $r_{k,w}$ to decoder system 1600 is $$r_{k,w} = a_{k,w} \alpha_1 a_{k-1,w} + \alpha_2 a_{k-2,w}. \tag{27}$$

Branch metric generator 1602-w computes the branch metrics $M_{k,w}(S \to S')$ for the state transitions displayed in FIG. 17. In the reduced state trellis shown in FIG. 17, branch metric generator 1602-w first decides on which of the two or three branches of the transition from state S to state S' to assign to the state transition S→S'. The decision as to which branch performs the S→S' transition is based on calculating a distance metric for each branch and choosing the branch having the lowest distance metric. For example, in the transition from state S=XX to state S'=XX, branch metric generator 1602-w first determines which of the two branches (−1 or +1) is traversed before calculating the branch metric $M_{k,w}(S \to S')$. The decision as to which branch is traversed is stored in branch decision $B_{k,w}(S \to S')$. The branch decision $B_{k,w}(S \to S')$ and the branch metric $M_{k,w}(S \to S')$ are both communicated to add-compare-select (unit) 1603-w.

For each state S at k−1, symbols $\hat{a}_{k-1}(S)$ and $\hat{a}_{k-2}(S)$ are known based upon feedback from ACS 1603-w to branch metric generator 1602-w as shown in FIG. 16. For each state transition S→S', branch metric generator 1602-w takes the difference between the input signal $r_{k,w}$ and the ISI portion of Equation 27 to obtain a difference $\sigma(S \to S')$ given as $$\sigma(S \to S') = r_{k,w} - \alpha_1 \hat{a}_{k-1,w}(S) - \alpha_2 \hat{a}_{k-2,w}(S). \tag{28}$$

The difference $\sigma(S \to S')$ is then compared with the symbols for each possible branch of the state transition S to S'. The symbol $a'_{k,w}(S \to S')$ chosen for the branch is then assigned to the transition from state S to state S'.

Figure 18:
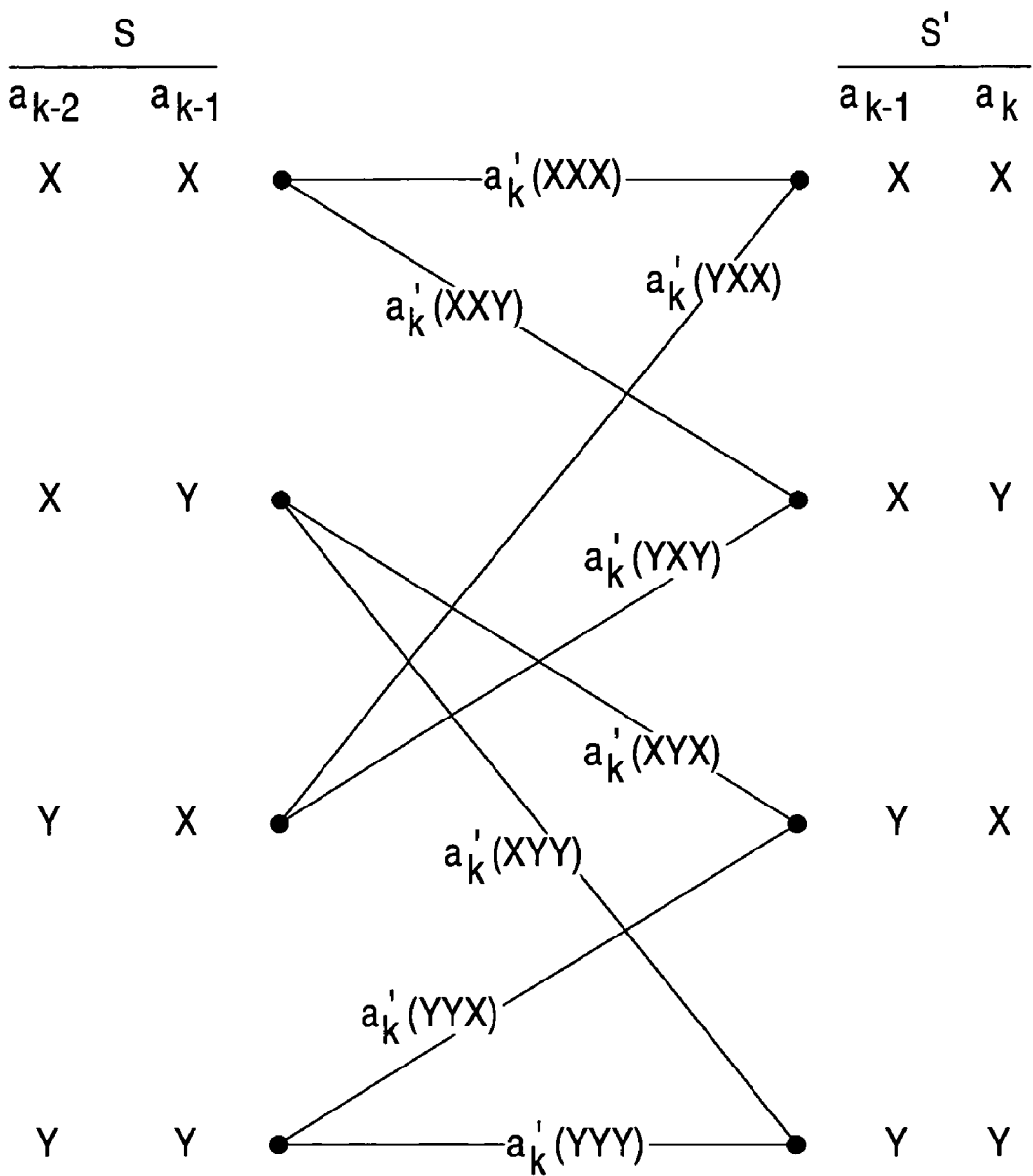
FIG. 18 shows a trellis diagram illustrating state changes between the reduced states of a reduced complexity sequence detector after branch path decisions have been made.

With reference to FIG. 18, the branch metrics $M_{k,w}(S \to S')$ can be computed for each transition from state S to state S' according to the equation:

$$M_{k,w}(S \to S') = [r_{k,w} - a'_{k,w}(S \to S') - \alpha_1 \hat{a}_{k-1,w}(S) - \alpha_2 \hat{a}_{k-2,w}(S)]^2. \tag{29}$$

where the valid transitions (S→S') in FIG. 18 are S→S'=XXX, XXY, YXX, YXY, XYX, XYY, YYX and YYY. The notation "ABC" used above and in FIG. 18, where each of "A", "B" and "C" is X or Y, indicates an S→S' transition from S=AB to S'=BC.

Add-compare-select 1603-w receives the branch metrics $M_{k,w}(S \to S')$ and branch decisions $B_{k,w}(S \to S')$ from branch metric generator 1602-w and calculates the state metrics $p_{k,w}(S')$ according to the equation $$p_{k,w}(S') = \min_{j=\{S\}} \{p_{k-1,w}(j) + M_{k,w}(j \to S')\}, \tag{30}$$

where j is equal to each S such that S→S' is allowable and "min" once again means minimum.

Add-compare-select 1603-w also determines the ACS comparison result $D_{k,w}(S')$ and the ACS error result $\Delta_{k,w}(S')$ for each of the four states S' and communicates those results $D_{k,w}(S')$ and $\Delta_{k,w}(S')$ to traceback circuit 1604. The ACS comparison result $D_{k,w}(S')$ is the path resulting in state S' having state metric $p_{k,w}(S')$ determined from Equation 30. Because there are only two allowed paths that result in state S' (see FIGS. 17 and 18), the second best choice is automatically the path that is contraindicated by ACS result $D_{k,w}(S')$ and need not be separately stored.

The error $\Delta_{k,w}(S')$ is the difference in state metrics $p_{k,w}(S')$ between the two paths resulting in state S':

$$\Delta_{k,w}(S') = |\{p_{k-1,w}(S_1) + M_{k,w}(S_1 \to S')\} - \{p_{k-1,w}(S_2) + M_{k,w}(S_2 \to S')\}|, \tag{31}$$

where $S_1$ is one of the two initial states that transition to the final state S', and $S_2$ is the other of the two initial states that transition to the final state S'. For example, from FIG. 18, if S'=YX, $S_1$ and $S_2$ are then the states XY and YY, respectively.

Finally, the branch decisions $B_{k,w}(S \to S')$ of branch metric generator 1602-w are also communicated from add-compare-select 1603-w to traceback circuit 1604 in the form of ACS branch decisions $B1_{k,w}(S')$ and $B2_{k,w}(S')$. Branch decision $B1_{k,w}(S')$ corresponds to the decision on the path S→S' indicated by $D_{k,w}(S')$. Branch decision $B2_{k,w}(S')$ corresponds to the decision on the path S→S' contraindicated by $D_{k,w}(S')$. Therefore, in the soft-decision process, if the traceback circuit 1604 is altered to the second most likely path, the parallel path decision for the second most likely path is available to traceback circuit 1604.

Traceback circuit 1604 can be the same as traceback 1404 of FIG. 15 except that read modules 1501-1 through 1501-4 receive a different set of parameters $\Gamma_{k,w}$. In traceback circuit 1604, parameters $\Gamma_{k,w}$ include the ACS parameters $D_{k,w}(S_i)$, $\Delta_{k,w}(S_i)$, $B1_{k,w}(S_i)$, and $B2_{k,w}(S_i)$, where $S_1$=(XX, XY, YX, YY). The starting point $SP_{k,w}$ from starting point determiner 1605-w is also provided as another $\Gamma_{k,w}$ parameter to traceback circuit 1604. As described above, read modules 1501-1 through 1501-4 store the ACS results in memory. Starting from starting point $SP_{k,w}$ determined by starting point determiner 1605, read modules 1501-1 through 1501-4 determine the most likely symbol $â_{k,w}$ and the second most likely symbol $â2_{k,w}$ for clock cycle k. A reliability measure $\epsilon_{k,w}$ indicating the difference in distance metrics between the most likely symbol $â_{k,w}$ and the second most likely symbol $â2_{k,w}$ is also determined.

As is shown in FIG. 15, read modules 1501-1 through 1501-4 output (a) the parameters $â_{k,w}$ to parity check 1502 and decoder 1504, (b) the parameters $â2_{k,w}$ to decoder 1504, and (c) the parameters $\epsilon_{k,w}$ to error analysis 1503. As was previously discussed, decoder 1504 outputs the best symbols $â'_{k,w}$ based on the parity check and informs read modules 1501-1 through 1501-4 of the choice. Read modules 1501-1 through 1501-4 then proceed to determine the most likely symbols $â_{k-1,1}$ through $â_{k-1,4}$, respectively, and the second most likely symbols $â2_{k-1,1}$ through $â2_{k-1,4}$, respectively, for clock cycle k−1 until the traceback is complete.

In sequence detector 1600-w of FIG. 16, the minimum squared distance between parallel branches of any transition S→S' should be at least twice as large as the minimum squared distance of the overall decoder. Because there is no protection between parallel bench decisions S→S" of sequence detector 1600-w, this requirement on minimum squared distances should hold true in order to prevent the overall minimum squared distance from decreasing because of reduced state detection.

As was previously discussed, the 4-D parity code provides 3 dB of coding gain, which doubles the minimum squared distance between possible paths. However, this code provides no protection between parallel branches of transitions along one wire. Therefore, this overall requirement on minimum distances prevents the minimum squared distance from decreasing because of reduced state detection. This requirement holds for Gigabit Ethernet standards, as described above. Although the requirement should hold in general, it may not be held for all embodiments of the invention.

Simplified Decision Feedback Equalization

Reduced sequence detection can also be accomplished utilizing decision feedback equalization (DFE). A simplified DFE provides a simple and easy implementation for accomplishing the equalization process in the allotted time (8 ns in the example of gigabit/s transmission over four wires).

Figure 19:
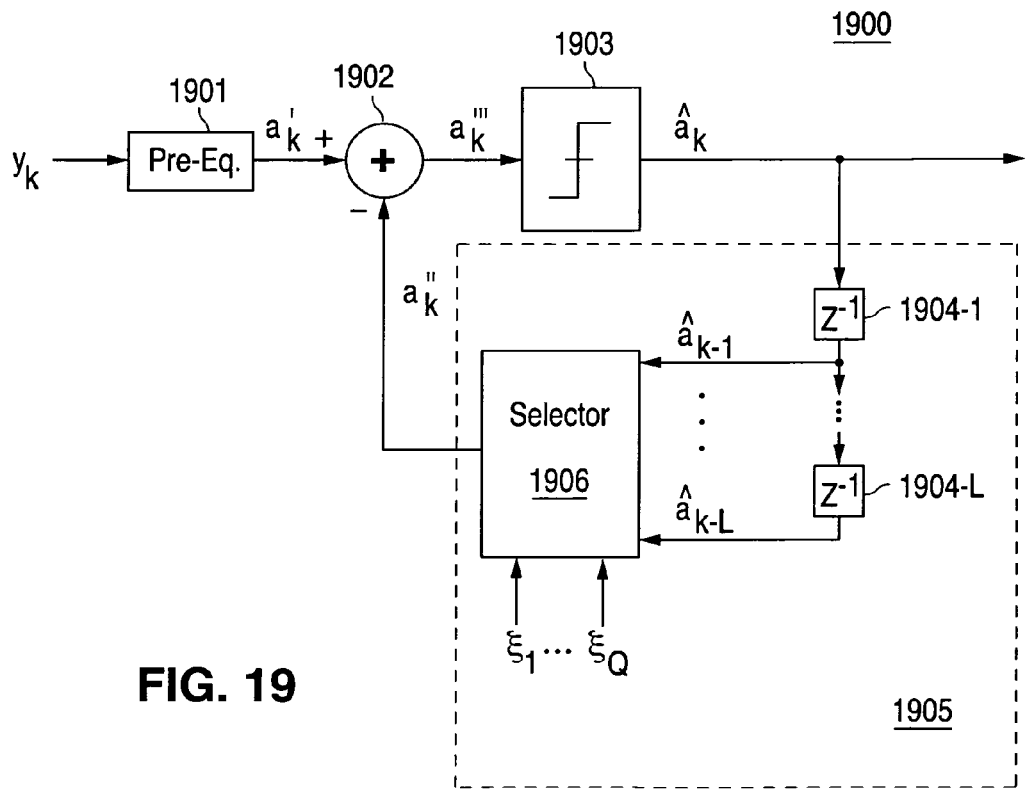
FIG. 19 shows a block diagram of a decision feedback equalizer having a simplified feedback section according to the present invention.

FIG. 19 shows an example of a simplified decision feedback equalizer 1900. The simplified decision feedback equalizer 1900 includes a pre-equalizer section 1901, an adder 1902, a slicer 1903, and a feedback section 1905. Pre-equalizer section 1901 can be any equalizer structure that reduces the ISI length to L symbols. Pre-equalizer section 1901, therefore, executes the transfer function.

$$T(Z) = (1 + \alpha_1 Z^{-1} + \ldots + \alpha_L Z^{-L})/f(Z) \qquad (32)$$

where $\alpha_1$ through $\alpha_L$ are the multiplier coefficients of pre-equalizer section 1901 and f(Z) is the response of the input channel (see Equation 2 for the response of a transfer channel).

The output signal $a'_k$ from pre-equalizer (or feedforward) section 1901 is input to adder 1902. Adder 1902 subtracts the signal $a''_k$ provided by selector 1906 from the output signal $a'_k$ provided by feedforward section 1901. The resulting signal $a'''_k = a'_k - a''_k$ is input to slicer 1903. Slicer 1903 outputs a symbol $â_k$ that is closest to the input signal $a'''_k$. The feedback section 1905 (see also feedback section 811 of FIG. 8) of decision feedback equalizer 1900 comprises L delays 1904-1 through 1904-L and selector 1906. Selector 1906 receives each of L past symbols $â_{k-1}$ through $â_{k-L}$ and uses symbols $â_{k-1}$ through $â_{k-L}$ to access a lookup table. The lookup table holds Q values $\xi_1$ through $\xi_Q$. The output signal $a''_k$ of selector 1906 then is that one of values $\xi_1$ through $\xi_Q$ that corresponds to the combination of inputs $â_{k-1}$ through $â_{k-L}$. The time required to look the results up in a look-up table is much less than the time required to perform the L multiplications and L additions required of the feedback section shown, for example, as feedback section 811 of FIG. 8.

In some embodiments, selector 1906 receives the look-up values $\xi$hd 1 through $\xi_Q$ as input signals. In some embodiments, the look-up values $\xi_1$ through $\xi_Q$ are preset. The look-up values $\xi_1$ through $\xi_Q$ can also be adaptively chosen to optimize performance of the receiver of which decision feedback equalizer 1900 is a part. In most embodiments, $Q=A^L$ where A is the size of the symbol alphabet.

As an example, in a system using the PAM-5 alphabet where L is 2 and Q is 25, there are twenty-five look-up values $\xi_1$ through $\xi_{25}$. Because the intersymbol interference in the input signal $a'_k$ to adder 1902 is the result of two ISI symbols.

$$a'_k = a_k + \alpha a_{k-1} + \beta a_{k-2} + n_k, \qquad (33)$$

where $\alpha$ and $\beta$ are the interference parameters and $n_k$ is random noise. The twenty-five values $\xi_1$ through $\xi_{25}$ for the look-up table, therefore, are given by:

$a''_k = \xi_1 = 2\alpha + 2\beta$ if $(â_{k-1}=2)$ and $(â_{k-2}=2)$;

$a''_k = \xi_2 = 2\alpha + \beta$ if $(â_{k-1}=2)$ and $(â_{k-2}=1)$;

$a''_k = \xi_3 = 2\alpha$ if $(â_{k-1}=2)$ and $(â_{k-2}=0)$;

$a''_k = \xi_4 = 2\alpha - \beta$ if $(â_{k-1}=2)$ and $(â_{k-2}=-1)$;

$a''_k = \xi_5 = 2\alpha - 2\beta$ if $(â_{k-1}=2)$ and $(â_{k-2}=-2)$;

$a''_k = \xi_6 = \alpha + 2\beta$ if $(â_{k-1}=1)$ and $(â_{k-2}=2)$;

$a''_k = \xi_7 = \alpha + \beta$ if $(â_{k-1}=1)$ and $(â_{k-2}=1)$;

$a''_k = \xi_8 = \alpha$ if $(â_{k-1}=1)$ and $(â_{k-2}=0)$;

$a''_k = \xi_9 = \alpha - \beta$ if $(â_{k-1}=1)$ and $(â_{k-2}=-1)$;

$a''_k = \xi_{10} = \alpha - 2\beta$ if $(â_{k-1}=1)$ and $(â_{k-2}=-2)$;

$a''_k = \xi_{11} = 2\beta$ if $(â_{k-1}=0)$ and $(â_{k-2}=2)$;

$a''_k = \xi_{12} = \beta$ if $(â_{k-1}=0)$ and $(â_{k-2}=1)$;

$a''_k = \xi_{13} = 0$ if $(â_{k-1}=0)$ and $(â_{k-2}=0)$;

$a''_k = \xi_{14} = -\beta$ if $(â_{k-1}=0)$ and $(â_{k-2}=-1)$;

$a''_k = \xi_{15} = -2\beta$ if $(â_{k-1}=0)$ and $(â_{k-2}=-2)$;

$a''_k = \xi_{16} = -\alpha + 2\beta$ if $(â_{k-1}=-1)$ and $(â_{k-2}=2)$ $a''_k = \xi_{17} = -\alpha + \beta$ if $(â_{k-1}=-1)$ and $(â_{k-2}=1)$; and $a''_k = \xi_{18} = -\alpha$ if $(â_{k-1}=-1)$ and $(â_{k-2}=0)$;

$a''_k = \xi_{19} = -\alpha - \beta$ if $(â_{k-1}=-1)$ and $(â_{k-2}=-1)$;

$a''_k = \xi_{20} = \alpha - 2\beta$ if $(\hat{a}_{k-1} = -1)$ and $(\hat{a}_{k-2} = -2)$;

$a''_k = \xi_{21} = -2\alpha + 2\beta$ if $(\hat{a}_{k-1} = -2)$ and $(\hat{a}_{k-2} = 2)$;

$a''_k = \xi_{22} = -2\alpha + \beta$ if $(\hat{a}_{k-1} = -2)$ and $(\hat{a}_{k-2} = 1)$;

$a''_k = \xi_{23} = -2\alpha$ if $(\hat{a}_{k-1} = -2)$ and $(\hat{a}_{k-2} = 0)$;

$a''_k = \xi_{24} = -2\alpha - \beta$ if $(\hat{a}_{k-1} = -2)$ and $(\hat{a}_{k-2} = -1)$;

$a''_k = \xi_{25} = -2\alpha - 2\beta$ if $(\hat{a}_{k-1} = -2)$ and $(\hat{a}_{k-2} = -2)$. (34)

The parameters $\alpha$ and $\beta$ can be adaptively chosen and the table updated periodically by calculating the look-up values $\xi_1$ through $\xi_Q$ and inputting them into selector 1906. When decision feedback equalizer 1900 is utilized, for example, as equalizer 505-$j$ in receiver 501-$j$ of FIG. 5B, look-up values $\xi_1$ through $\xi_Q$ can be calculated by coefficient update 506-$j$ and read into equalizer 505-$j$.

FIG. 20A shows a sequence detector 2000. Sequence detector 2000 can be any sequence detector system having feedback, including sequence detector 1300 (FIG. 13) and sequence detector 1600 (FIG. 16). As before, sequence detector 2000 utilizes any symbol alphabet and includes trellis decoding for any number of past ISI symbols.

Pre-equalizer section 2001 of sequence detector 2000 receives signal $y_{k,w}$, and executes a transfer function, such as that of Equation 32, which removes the ISI influence of all but L past symbols. Feedback section 2003 outputs feedback signal $a''_{k,w}$ that removes the influence of an additional M past symbols based on ACS signal $S_{k,w}$ input from add-compare-select (unit) 2005. Sequence detector 2000 therefore utilizes states describing the past L-M ISI symbols. FIG. 12, for example, illustrates a trellis diagram for L-M=1. FIGS. 17 and 18, for example, illustrate a trellis diagram for a reduced state sequence detector with L-M=2.

As occurs in branch metric generators 1101, 1302, 1402-w, and 1602-w, branch metric generator 2004 outputs a set of branch metrics $M_{k,w}(S \rightarrow S')$ for transitions between states S and state S' of the decoder. ACS 2005 outputs the ACS results $D_{k,w}(S')$ to traceback circuitry 2006, and the state (or transition) metrics $p_{k,w}(S')$ to starting point determiner 2007. Traceback circuit 2006 outputs the symbols $\hat{a}_{k,w}$ decided by sequence detector 2000, in reverse chronological order, and LIFO 2008 reverses the order of those symbols $\hat{a}_{k,w}$ to produce output symbol stream $\{\hat{a}_{k,w}\}$.

The output signals $S_{k,w}$ outputted from ACS 2005 to feedback section 2003 are given by the traced back sequence from traceback circuit 2006.

From FIG. 20A, if the past L symbols have been properly decoded, the influence of intersymbol interference will be completely canceled. In general, feedback section 2003 can be any feedback structure. An exemplary feedback section is feedback section 811 shown in FIG. 8. Feedback section 811, however, includes P multipliers (multipliers 806-1 through 806-P) and a P-input adder (adder 807) for the case of M ISI symbol cancellation with P equal to M.

One embodiment of feedback section 2003 includes feedback sections like feedback section 811. For Gigabit Ethernet, at symbol rates of 125 MHz on each wire, the timing constraints of the sequence detector are severe. When "per-survivor processing"(see, e.g., sequence detector 1300 of FIG. 13) is used, feedback section 2003 must include feedback section 811 repeated for each state of equalizer 2000 because the final state of equalizer 2000 is not determined until the latest decision of ACS 2005 (i.e., the parameters $S_{k,w}$ are determined by ACS 2005).

FIG. 20B shows an embodiment of feedback section 2003 that includes a look-up feedback section 2100. Look-up feedback section 2100 outputs feedback signal $a''_{k,w}$ generated from look-up values $\xi_1$ through $\xi_Q$ in response to the ACS parameters $S_{k,w}$ consisting specifically of the L ACS parameters $S_{k-1}$ through $S_{k-L}$ provided respectively by L delays 2101-1 through 2101-L in feedback section 2003. Look-up values $\xi_1$ through $\xi_Q$ can be preloaded into feedback section 2100 or may be periodically adaptively chosen and read into feedback section 2100. Values for look-up values $\xi_1$ through $\xi_Q$ for two ISI symbols and a PAM-5 symbol alphabet are given above in Equation 34.

The embodiments discussed above are exemplary only and are not intended to be limiting. One skilled in the art will recognize multiple variations of these embodiments that are intended to be included within the scope of this disclosure. As such, the invention is limited only by the following claims.

We claim:

1. An electronic circuit comprising a sequence detector for converting a sequence of digital values of a detector input signal into a sequence of symbols chosen from an alphabet of predefined symbols allocated into multiple non-overlapping families each formed with a plurality of the predefined symbols, each of a multiplicity of states of the sequence detector defined at least partially by at least one of the families, the sequence detector comprising:

a branch metric generator (a) for making intra-family branch selections during multiple time periods which each progressively become the kth time period where k is a running integer, each branch selection being one of a plurality of branches respectively corresponding to the predefined symbols of a family for transitioning from one of the states at the (k–1)th time period to one of the states at the kth time period, and (b) for generating branch metrics each being a measure of how much one of the digital values differs from a transition value corresponding to one of the branch selections for a transition from one of the states at the (k–1)th time period along an allowable path to one of the states at the kth time period;

comparison circuitry (a) for determining state metrics each being the best of a set of state-metric computations for a particular state at the kth time period where each state-metric computation depends on the state metric for a state at the (k–1)th time period and the branch metric for a transition from that state at the (k–1)th time period to the particular state at the kth time period and (b) for generating comparison results each indicating which state at the (k–1)th time period is the state in the state-metric computation that constitutes the state metric for a state at the kth time period; and symbol generation circuitry for utilizing the comparison results and the branch selections or selection information generated from the branch selections to generate a final sequence of the predefined symbols such that the final sequence approximates, as a sequence, the sequence of digital values.

2. A circuit as in claim 1 wherein the branch metric generator makes the branch selection for a family at the kth time period by (a) determining distance metrics at the kth time period for the branches for that family's predefined symbols, each distance metric being a measure of how much one of the digital values differs from a branch-selection transition value for transitioning from one of the states at the (k–1)th time period to one of the states at the kth time period, and (b)

selecting, as that family's branch selection, the branch having the best of that family's distance metrics at the kth time period.

3. A circuit as in claim 2 wherein the branch selection for a family at the kth time period is the branch having the minimum of that family's distance metrics at the kth time period.

4. A circuit as in claim 1 wherein the branch metric generator adjusts the transition values to compensate for intersymbol interference in the detector input signal.

5. A circuit as in claim 4 wherein each transition value substantially consists of the sum of (a) a value corresponding to one of the predefined symbols and (b) at least one product of an intersymbol interference coefficient and a corresponding previously determined one of the predefined symbols in the final sequence.

6. A circuit as in claim 5 wherein one such product is the product of a single-delay intersymbol interference coefficient and the immediately previous one of the predefined symbols in the final sequence.

7. A circuit as in claim 5 wherein each branch metric is substantially proportional to the square of the difference between one of the digital values and one of the transition values.

8. A circuit as in claim 1 wherein the comparison circuitry determines the state-metric computation for a particular state at the kth time period substantially as the sum of the state metric for a state at the (k−1)th time period and the branch metric for a transition from the state at the (k−1)th time period to the particular state at the kth time period.

9. A circuit as in claim 1 wherein each pair of branches for a pair of predefined symbols of each family is of greater minimum squared distance than any pair of branches consisting of a branch for a predefined symbol in any of the families and a branch for a predefined symbol in any other of the families.

10. A circuit as in claim 1 wherein there are two families of the predefined symbols.

11. A circuit as in claim 10 wherein (a) one of the families consists of alternating ones of the predefined symbols when they are arranged sequentially and (b) the other of the families consists of the remaining ones of the predefined symbols.

12. A system as in claim 1 wherein the symbol alphabet contains a prime number of at least five predefined symbols.

13. A circuit as in claim 1 further including an equalizer responsive to a digital equalizer input signal for providing the detector input signal at a lower intersymbol interference length than in the equalizer input signal.

14. A circuit as in claim 1 wherein:
each state metric which is the best of a set of state-metric computations for a particular state at the kth time period constitutes a best state metric;
each comparison result that indicates which state at the (k−1)th time period is the state in the state-metric computation that constitutes the best state metric for a state at the kth time period constitutes a best comparison result;
the comparison circuitry also (a) determines second-best state metrics each being the second-best of the set of state-metric computations for a particular state at the kth time period and (b) generates second-best comparison results each indicating which state at the (k−1)th time period is the state in the state-metric computation that constitutes the second best state metric for the state at the kth time period; and
the symbol generation circuitry also utilizes the second-best comparison results in generating the final sequence of the predefined symbols.

15. A circuit as in claim 14 wherein the symbol generation circuitry (a) utilizes the best comparison results to generate a preliminary sequence of the predefined symbols, (b) checks for error in the preliminary sequence, and (c) utilizes the second-best comparison results in correcting any such error in the preliminary sequence so as to convert it into the final sequence.

16. A circuit as in claim 15 wherein the symbol generation circuitry:
traverses through the best and second-best comparison results to respectively identify best and second-best ones of the predefined symbols for each time period where the best predefined symbols form the preliminary sequence; and
replaces the best predefined symbol for a time period with the second-best predefined symbol for that time period if (i) an error appears to occur in the preliminary sequence at a location corresponding to that time period and (ii) the second-best predefined symbol for that time period appears more appropriate in the preliminary sequence at the location corresponding to that time period than the best predefined symbol for that time period.

17. A circuit as in claim 14 wherein the comparison circuitry determines the state-metric computation for a particular state at the kth time period substantially as the sum of the state metric for a state at the (k−1)th time period and the branch metric for a transition from that state at the (k−1)th time period to the particular state at the kth time period.

18. A circuit as in claim 17 wherein the comparison circuitry generates the best and second-best state metrics for a state at the kth time period substantially as the lowest and second-lowest of that state's state-metric computation at the kth time period.

19. A circuit as in claim 14 wherein:
the comparison circuitry generates difference results, each difference result being a measure of how much the best state metric for a state at the kth time period differs from that state's second-best state metric at the kth time period; and
the symbol generation circuitry further utilizes the difference results in generating the final sequence.

20. A circuit as in claim 19 wherein the symbol generation circuitry (a) utilizes the best comparison results to generate a preliminary sequence of the predefined symbols, (b) checks for error in the preliminary sequence, and (c) utilizes the second-best comparison results in light of the difference results to correct any such error in the preliminary sequence and thereby convert it into the final sequence.

21. A circuit as in claim 20 wherein the symbol generation circuitry:
traverses through the best and second-best comparison results to respectively identify best and second-best ones of the predefined symbols for each time period where the best predefined symbols form the preliminary sequence; and
replaces the best predefined symbol for a time period with the second-best predefined symbol for that time period if (i) an error appears to occur in the preliminary sequence at a location corresponding to that time period and (ii) the second-best predefined symbol for that time period appears more approximate in the preliminary sequence at the location corresponding to that time period than the best predefined symbol for that time period in light of the difference results for that time period.

22. An electronic system comprising a plurality of circuits as in claim 19 wherein the symbol generation circuitries form a composite symbol generator that utilizes the best comparison results of the sequence detector in each circuit of claim 19 to generate a preliminary sequence of the predefined symbols for that sequence detector, the composite symbol detector comprising:
- a like plurality of modules respectively corresponding to the sequence detectors, each module operating in response to the best comparison, second-best comparison, and difference results of the corresponding sequence detector for each time period to produce a best one of the predefined symbols for each time period, a second-best one of the predefined symbols for that time period, and an associated reliability measure for that time period, the best predefined symbols for each sequence detector forming that detector's preliminary sequence;
- parity check circuitry for generating a parity signal for each time period in response to the best predefined symbols for that time period;
- error analysis circuitry for generating an error-indication signal for each time period in response to the reliability measure for that time period to indicate which of the best predefined symbols for that time period is most likely to be incorrect; and
- decoding circuitry responsive to the parity and error-indication signals for each time period for selecting a final one of the predefined symbols for each sequence detector for that time period from that detector's best and second-best predefined symbols for that time period.

23. A system as in claim 22 wherein the reliability measure for each time period for each sequence detector substantially constitutes the difference result for that time period for the best and second-best state-metric computations corresponding to that detector's best and second-best predefined symbols for that time period.

24. A system as in claim 22 wherein the decoding circuitry substantially selects the best predefined symbols respectively as the final predefined symbols except when the parity signal indicates a parity error at a time period in which event, for the sequence detector whose best predefined symbol for that time period is indicated as most likely to be incorrect, the decoding circuitry selects that detector's second best predefined symbol for that time period as that detector's final predefined symbol for that time period.

25. A system as in claim 22 wherein:
- the decoding circuitry combines the best predefined symbols for each time period to produce a best multi-dimensional symbol for that time period; and
- the parity check circuitry generates the parity signal for each time period at a value corresponding to the parity of the multi-dimensional symbol for that time period.

26. A system as in claim 25 wherein the decoding circuitry combines the final predefined symbols for each time period to produce a final sequence of multi-dimensional symbols.

27. A method for converting a sequence of digital values of an input signal into a sequence of symbols chosen from an alphabet of predefined symbols allocated into multiple non-overlapping families each formed with a plurality of the predefined symbols for which each of a multiplicity of states is defined at least partially by at least one of the families, the method comprising:
- making intra-family branch selections during multiple time periods which each progressively become the kth time period where k is a running integer, each branch selection being one of a plurality of branches respectively corresponding to the symbols of a family for transitioning from one of the states at the (k−1)th time period to one of the states at the kth time period;
- generating branch metrics each being a measure of how much one of the digital values differ from a transition value corresponding to one of the branch selections for a transition from one of the states at the (k−1)th time period along an allowable path to one of the states at the kth time period;
- determining state metrics each being the best of a set of state-metric computations for a particular state at the kth time period where each state-metric computation depends on the state metric for a state at the (k−1)th time period and the branch metric for a transition from that state at the (k−1)th time period to the particular state at the kth time period;
- generating comparison results each indicating which state at the (k−1)th time period is the state in the state-metric computation that constitutes the state metric for a state at the kth time period; and
- utilizing the comparison results and the branch selections or selection information generated from the branch selections to generate a final sequence of the predefined symbols such that the final sequence approximates, as a sequence, the sequence of digital values.

28. A method as in claim 27 wherein the branch-selections making act comprises:
- determining distance metrics at the kth time period for the branches for the predefined symbols of a family, each distance metric being a measure of how much one of the digital values differs from a branch-selection transition value for transitioning from one of the states at the (k−1)th time period to one of the states at the kth time period; and
- selecting, as that family's branch selection, the branch having the best of that family's distance metrics at the kth time period.

29. A circuit as in claim 28 wherein the branch-selecting act comprises selecting the branch having the minimum of the distance metrics for a family at the kth time period as that family's branch selection at the kth time period.

30. A method as in claim 27 wherein the generating act includes adjusting the transition values to compensate for intersymbol interference in the input signal.

31. A method as in claim 27 wherein the state-metrics determining act comprises determining the state-metric computation for a particular state at the kth time period substantially as the sum of the state metric for a state at the (k−1)th time period and the branch metric for a transition from that state at the (k−1)th time period to the particular state at the kth time period.

32. A method as in claim 27 wherein (a) each state metric which is the best of a set of state-metric computations for a particular state at the kth time period constitutes a best state metric and (b) each comparison result that indicates which state at the (k−1)th time period is the state in the state-metric computation that constitutes the best state metric for a state at the kth time period constitutes a best comparison result, the method further including:
- determining second-best state metrics each being the second-best of the set of state-metric computations for a particular state at the kth time period; and
- generating second-best comparison results each indicating which state at the (k−1)th time period is the state in the state-metric computation that constitutes the second-best state metric for a state at the kth time period; and
- utilizing the second-best comparison results in generating the final sequence of the predefined symbols.

33. A method as in claim 32 wherein the utilizing acts comprise:

utilizing the best comparison results to generate a preliminary sequence of the predefined symbols;

checking for error in the preliminary sequence; and utilizing the second-best comparison results in correcting any such error in the preliminary sequence so as to convert it into the final sequence.

34. A method as in claim 33 wherein the utilizing acts further include:

traversing through the best and second-best comparison results to respectively identify best and second-best ones of the predefined symbols for each time period where the best predefined symbols form the preliminary sequence; and replacing the best predefined symbol for a time period with the second-best predefined symbol for that time period if (i) an error appears to occur in the preliminary sequence at a location corresponding to that time period and (ii) the second-best predefined symbol for that time period appears more appropriate in the preliminary sequence at the location corresponding to that time period than the best predefined symbol for that time period.

35. A method as in claim 32 further including:

producing difference results, each difference result being a measure of how much the best state metric for a state at the kth time period differs from that state's second-best state metric at the kth time period; and utilizing the difference results in generating the final sequence.

36. A method as in claim 35 wherein the utilizing acts comprise:

utilizing the best comparison results to generate a preliminary sequence of the predefined symbols;

checking for error in the preliminary sequence; and utilizing the second-best comparison results in light of the difference results to correct any such error in the preliminary sequence and thereby convert it into the final sequence.

37. A method as in claim 36 wherein the utilizing acts further include:

traversing through the best and second-best comparison results to respectively identify best and second-best ones of the predefined symbols for each time period where the best predefined symbols form the preliminary sequence; and replacing the best predefined symbol for a time period with the second-best predefined symbol for that time period if (i) an error appears to occur in the preliminary sequence at a location corresponding to that time period and (ii) the second-best predefined symbol for that time period appears more appropriate in the preliminary sequence at the location corresponding to that time period than the best predefined symbol for that time period in light of the difference results for that time period.

38. A method for converting sequences of digital values of a plurality of input signals respectively into a like plurality of sequences of symbols chosen from an alphabet of predefined symbols allocated into multiple non-overlapping families each formed with a plurality of the symbols for which each of a plurality of states is defined at least partially by at least one of the families, the method being performed on each input signal as in claim 35, the method further including:

utilizing the best comparison results for each input signal to generate a preliminary sequence of the predefined symbols for that input signal;

producing, for each input signal, a best one of the predefined symbols for each time period, a second-best one of the predefined symbols for that time period, and an associated reliability measure for that time period in response to the best comparison, second-best comparison, and difference results for that input signal for that time period, the best predefined symbols for each input signal forming the signal's preliminary sequence;

generating a parity signal for each time period in response to the best predefined symbols for that time period;

generating an error-indication signal for each time period in response to the reliability measure for that time period to indicate which of the best predefined symbols for that time period is most likely to be incorrect; and selecting a final one of the predefined symbols for each input signal for each time period from that signal's best and second-best predefined symbols for that time period in response to the parity and error-indication signals for that time period.

39. A system as in claim 38 wherein the reliability measure for each time period for each input signal substantially constitutes the difference result for that time period for the best and second-best state-metric computations corresponding to that input signal's best and second-best predefined symbols for that time period.

40. A method as in claim 38 wherein the selecting act comprises selecting the best predefined symbols respectively as the final predefined symbols except when the parity signal indicates a parity error at a time period and, in that event for the input signal whose best predefined symbol for that time period is indicated as most likely to be incorrect, selecting that signal's second best predefined symbol for that time period as that signal's final predefined symbol for that time period.

41. A method as in claim 38 further including combining the best predefined symbols for each time period to produce a best multi-dimensional symbol for that time period, the parity signal for each time period then being generated at a value corresponding to the parity of the multi-dimensional symbol for that time period.

42. A method as in claim 41 further including combining the final predefined symbols for each time period to produce a final sequence of multi-dimensional symbols.

* * * * *